(12) United States Patent
Tian

(10) Patent No.: US 10,672,144 B2
(45) Date of Patent: Jun. 2, 2020

(54) IMAGE DISPLAY METHOD, CLIENT TERMINAL AND SYSTEM, AND IMAGE SENDING METHOD AND SERVER

(71) Applicant: Zhonglian Shengshi Culture (Beijing) Co., Ltd., Beijing (CN)

(72) Inventor: Yuan Tian, Shanghai (CN)

(73) Assignee: Zhonglian Shengshi Culture (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/795,139

(22) Filed: Oct. 26, 2017

(65) Prior Publication Data

US 2018/0114341 A1 Apr. 26, 2018

(30) Foreign Application Priority Data

Oct. 26, 2016 (CN) .......................... 2016 1 0946987

(51) Int. Cl.
*G06T 7/73* (2017.01)
*G06F 3/00* (2006.01)
*G06F 3/0481* (2013.01)
*H04N 5/74* (2006.01)
(Continued)

(52) U.S. Cl.
CPC .................. *G06T 7/75* (2017.01); *G06F 3/00* (2013.01); *G06F 3/04815* (2013.01); *G06Q 10/02* (2013.01); *G06T 7/60* (2013.01); *G06T 7/74* (2017.01); *H04N 5/74* (2013.01); *G06T 2200/08* (2013.01); *G06T 2200/24* (2013.01)

(58) Field of Classification Search
CPC ................ G06T 7/73; G06T 7/74; G06T 7/75
See application file for complete search history.

(56) References Cited

U.S. PATENT DOCUMENTS 9,171,195 B1 * 10/2015 Rybakov .............. G06K 9/6807
2008/0259169 A1 * 10/2008 Nagano ................. H04N 5/145
348/208.4
2011/0316987 A1 12/2011 Komoriya et al.
(Continued)

FOREIGN PATENT DOCUMENTS

CN 102484733 5/2012
CN 102609867 A 7/2012
(Continued)

OTHER PUBLICATIONS

PCT Search Report and Written Opinion dated Feb. 24, 2018 for PCT Application No. PCT/IB2017/001447, 6 pages.
(Continued)

*Primary Examiner* — Yi Yang
(74) *Attorney, Agent, or Firm* — Lee & Hayes, P.C.

(57) ABSTRACT

A method, client terminal and server for displaying an image, and a method and a server for sending an image are disclosed. The image display method includes providing an input interface; receiving an input information from a user via the input interface, wherein the input information being used for determining an observation point; and displaying a projection image of at least one of an observation object or an observation area, wherein the projection image is an image formed by projecting the at least one of the observation object or the observation area onto a projection plane corresponding to the observation point. The present disclosure can display a viewing effect corresponding to an observation point.

19 Claims, 20 Drawing Sheets

(51) Int. Cl.
*G06Q 10/02* (2012.01)
*G06T 7/60* (2017.01)

(56) References Cited

U.S. PATENT DOCUMENTS

| | | | |
|---|---|---|---|
| 2012/0081520 A1* | 4/2012 | Lee | H04N 13/128 |
| | | | 348/47 |
| 2013/0033602 A1 | 2/2013 | Quast et al. | |
| 2016/0035140 A1* | 2/2016 | Bickerstaff | A63F 13/26 |
| | | | 345/633 |
| 2016/0142629 A1* | 5/2016 | Jung | H04N 5/23229 |
| | | | 348/218.1 |
| 2016/0202876 A1 | 7/2016 | Hosenpud et al. | |
| 2017/0230633 A1 | 8/2017 | Doh | |
| 2017/0359571 A1 | 12/2017 | Liu | |

FOREIGN PATENT DOCUMENTS

| | | | |
|---|---|---|---|
| CN | 104598656 | A | 10/2015 |
| CN | 105095973 | * | 11/2015 |
| CN | 105323518 | | 2/2016 |
| CN | 105657406 | | 6/2016 |
| CN | 106022899 | A | 10/2016 |

OTHER PUBLICATIONS

Translation of Chinese Office Action from corresponding CN Patent Application No. 201610946987.5, dated Feb. 27, 2019, 24 pages.
Translation of Chinese Search Report from corresponding CN Patent Application No. 201610946937.5, dated Jan. 22, 2019, 2 pages.
Translation of CN Office Action from Corresponding CN Application No. 201610946987.5 dated Sep. 16, 2019 , a counterpart foreign application for U.S. Appl. No. 15/795,139 , 24 pages.

* cited by examiner

IMAGE DISPLAY METHOD, CLIENT TERMINAL AND SYSTEM, AND IMAGE SENDING METHOD AND SERVER

CROSS REFERENCE TO RELATED PATENT APPLICATIONS

This application claims foreign priority to Chinese Patent Application No. 201610946987.5, filed on Oct. 26, 2016, entitled "Image Display Method, Client Terminal and System, and Image Sending Method and Server," which is hereby incorporated by reference in its entirety.

TECHNICAL FIELD

The present disclosure relates to the field of computer technologies, and particularly to image display methods, client terminals and systems, and image sending methods and servers.

BACKGROUND

In daily life, people usually have various types of leisure and entertainment activities that require them to select and reserve seats in advance, e.g., going to a cinema to watch a movie, going to a theater to watch an opera or a drama, going to a stadium to watch a game, etc. When conducting these entertainment activities, people can usually select and reserve their seats through terminal devices such as a smartphone.

In existing technologies, a terminal device may provide a function of online seat selection to a user. Specifically, the terminal device normally displays an image of a venue in a form of a layout plan. The venue may be a movie hall of a cinema or a drama hall of a theater. The user can select a desired seat from the layout plan, and reserve the selected seat. An example of a layout plan 202 of a movie hall of a cinema provided by a terminal device is shown in FIG. 1. A seat that has been selected is grey in color, and a seat that is selectable is white in color in FIG. 1. The user can select a seat desired thereby and reserve the selected seat from the layout plan as shown in FIG. 1.

The existing technologies, however, have at least the following problems:

Existing online seat selection functions provided by a terminal device mostly provide a layout plan of seats in a venue. In this way, after selecting a seat via the terminal device, a user can only experience a viewing angle of the seat after entering in an actual venue in most of the time. For example, after making an online selection of a seat of a movie hall of a cinema via a terminal device, a user can only experience a viewing angle of the seat (i.e., a state of a screen as observed from the selected seat) after getting into the movie hall of the cinema in most cases. In some situations, a user may not know a viewing angle of a seat when the seat is selected. After entering in an actual venue, the seat is no longer changeable even if realizing that the selected seat has a relatively poor viewing angle.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The goals of the embodiments of the present disclosure are to provide a method, a client terminal and a system for displaying an image, and a method and a server for sending an image, in order to display an observation effect corresponding to an observation point.

In order to solve the aforementioned problems, the embodiments of the present disclosure provide implementations of a method, a client terminal and a system for displaying an image, and a method and a server for sending an image.

An image display method provided by the embodiments of the present disclosure may include providing an interface of a virtual venue image, the virtual venue image including a plurality of seats; receiving an operation triggering instruction of the interface of the virtual venue image, the operation triggering instruction being used for directing to at least one seat of the plurality of seats; presenting a projection image corresponding to the at least one seat, the projection image corresponding to the at least one seat being an image that is formed by projecting an observation object and/or an observation area onto a projection plane corresponding to the at least one seat.

The embodiments of the present disclosure further provide an image display method, which may include providing an input interface; receiving input information of a user in the input interface, the input information being used for determining an observation point; presenting a projection image of an observation object and/or an observation area, the projection image being an image formed from a projection of the observation object and/or the observation area on a projection plane corresponding to the observation point.

The embodiments of the present disclosure further provide a client terminal, which may include a display component being used for presenting an input interface; an input component being used for receiving input information of a user in the input interface; one or more processors coupled with the display component and the input component, being used for determining an observation point based on the input information, controlling the display component to present a projection image of an observation object and/or an observation area, the projection image being an image formed from a projection of the observation object and/or the observation area on a projection plane corresponding to the observation point.

The embodiments of the present disclosure further provide an image sending method, which may include establishing correspondence relationships between projection images and observation point identifiers, the projection images being images formed by projecting individual observation objects and/or individual observation areas onto respective projection planes, and the observation point identifiers being used for uniquely identifying individual observation points; receiving a request for obtaining a projection image, the request including a specific observation point identifier; obtaining the projection image corresponding to the specific observation point identifier based on the correspondence relationships between the projection images and the observation point identifiers; and sending the obtained projection image to a client terminal.

The embodiments of the present disclosure further provide a server, which may include a correspondence relationship creation unit configured to establish correspondence relationships between projection images and observation point identifiers, the projection images being images formed by projecting individual observation objects and/or individual observation areas onto respective projection planes, and the observation point identifiers being used for uniquely identifying individual observation points; a request receiving unit configured to receive a request for obtaining a projection image, the request including a specific observation point identifier; and a projection image acquisition unit configured to obtain the projection image corresponding to the specific observation point identifier based on the correspondence relationships between the projection images and the observation point identifiers; and a projection image sending unit configured to send the obtained projection image to a client terminal.

The embodiments of the present disclosure further provide an image display system, which may include a client terminal, the client terminal being configured to present a projection image, wherein the projection image is an image formed from a projection of an observation object and/or an observation area onto a projection plane in a venue model.

The embodiments of the present disclosure further provide an image display method, which may include providing a virtual venue image interface of a screening room, the virtual venue image interface including a plurality of seats; receiving an operation triggering instruction of the virtual venue image interface, the operation triggering instruction being used for directing to at least one seat of the plurality of seats; and a display ticketing interface, the display ticketing interface including a projection image corresponding to the at least one seat, wherein the projection image of the seat is an image that is formed from a projection of a screen of the screening room onto a projection plane corresponding to the seat.

The technical solutions of the embodiments of the present disclosure can provide a simulated viewing angle of a human at an observation point through determination of the observation point. As such, a user can know a state of an observation object and/or an observation area that is/are observed from the observation point without the need of visiting a venue in person, thus bringing convenience to the user.

BRIEF DESCRIPTION OF THE DRAWINGS

In order to describe the technical solutions of the embodiments of the present disclosure or the existing technologies in a better manner, accompanying drawings that are needed for the description of the embodiments or the existing technologies are briefly described herein. Apparently, the accompanying drawings that are described merely represent some embodiments recorded in the present disclosure. Based on these accompanying drawings, one of ordinary skill in the art can obtain other accompanying drawings without making any creative effort.

DETAILED DESCRIPTION

In order to facilitate one skilled in the art to understand the technical solutions of the present disclosure more clearly, the technical solutions of the embodiments of the present disclosure are described herein in a clear and comprehensive manner in conjunction with the accompanying drawings. Apparently, the describe embodiments merely represent a portion and not all of the embodiments of the present disclosure. All other embodiments that are obtained by one of ordinary skill in the art based on the embodiments in the present disclosure without making any creative effort shall fall within the scope of protection of the present disclosure.

Figure 1:
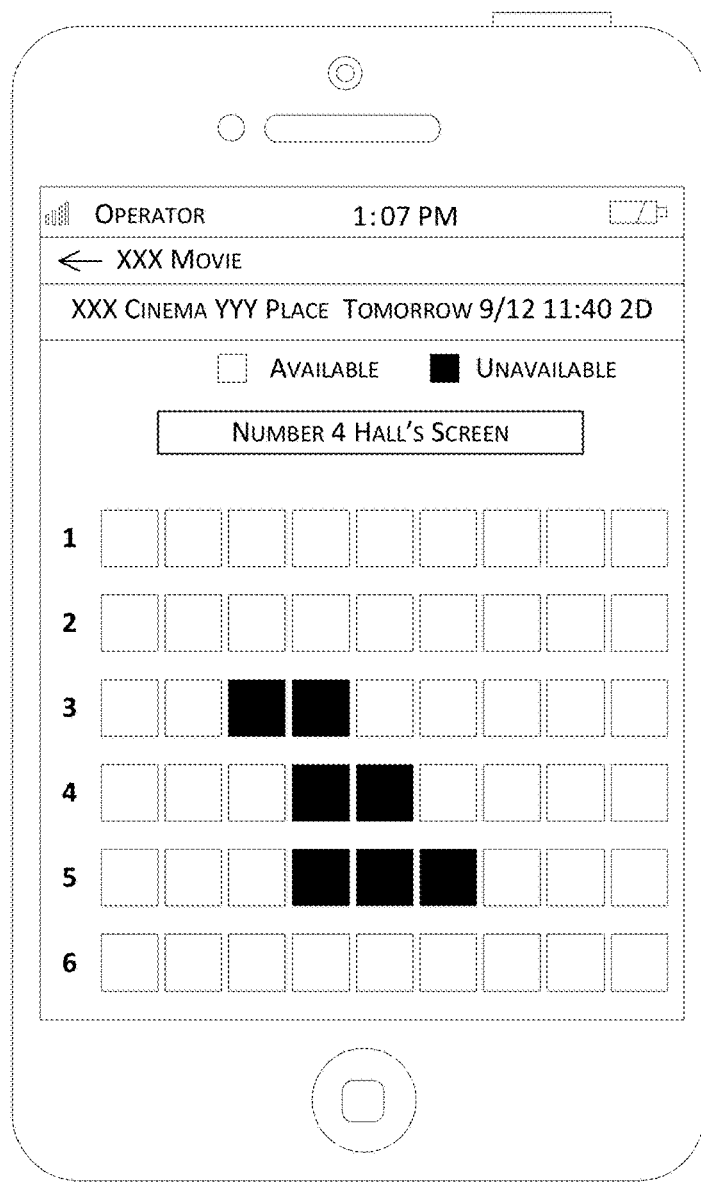
FIG. 1 shows a schematic diagram of a layout plan of a movie hall of a cinema in the existing technologies.
Figure 2:
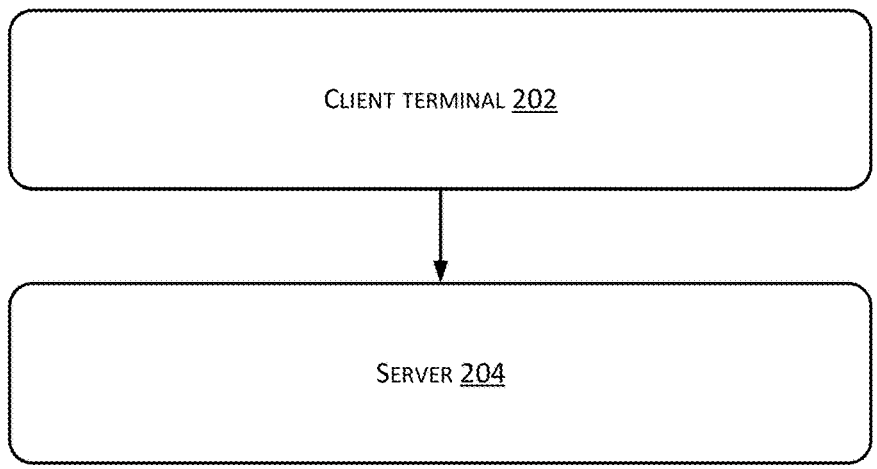
FIG. 2 shows a functional and structural diagram of an image display system in accordance with the embodiments of the present disclosure.

FIG. 2 shows an implementation of an image display system 200 in accordance with the present disclosure. The example system 200 may include a client terminal 202.

In implementations, the client terminal 202 may include a device having a display. The display may include, but is not limited to, a LCD (Liquid Crystal Display) display, a CRT (Cathode Ray Tube) display, a LED (Light Emitting Diode) display, etc.

The client terminal 202 may be a mobile device. For example, the client terminal 202 may be a smartphone, a tablet electronic device, a portable computer, a personal digital assistant (PDA), on-board equipment, or a smart wearable device, etc. The client terminal 202 may also be desktop equipment. For example, the client terminal 202 may be a server, an industrial controlling device (e.g., an industrial controlling computer), a personal computer (e.g., a PC device), an all-in-one machine, or a smart automated terminal (e.g., a kiosk), etc.

The client terminal 202 may display a projection image using a display. The projection image may be an image that is formed from a projection of an observation object and/or an observation area onto a virtual projection plane (or simply a projection plane hereinafter) in a venue model. The venue model may be a model that is formed by performing a modeling of data of a venue using a model creation algorithm. The model creation algorithm may include, but is not limited to, a grid based algorithm, a data fitting algorithm, a simulated annealing algorithm, etc. The venue model may include a simulated space environment including one or more objects. The observation object may be an object to be projected in the venue model. The observation area may be a simulated area that is observed from a viewing angle of a human in the venue model. The observation object may be located in the observation area, or may be located outside the observation area.

The projection plane may be determined based on a positional relationship between the observation object or the observation area in the venue model, and an observation point in the venue model. The observation point may be used for simulating a location of observation of a human in the venue model. Specifically, a projection plane may be constructed between the observation object or the observation area, and the observation point. A projection image of the observation object and/or the observation area onto the projection plane may be obtained, to achieve a simulation of a state of the observation object and/or the observation area that is observed by a human at the observation point. The projection plane may be a flat surface or a curved surface. The curved surface may include, but is not limited to, a spherical surface, a cylindrical surface, a conical surface, etc.

Table 1 shows commonly used venue models, and respective observation objects and/or observation areas in the venue models.

TABLE 1

| Venue model | Observation object | Observation area |
| --- | --- | --- |
| Movie hall of cinema | Screen | Area where the screen or a seat is located |
| Drama hall of theater | Stage | Area where the stage or a seat is located |
| Conference room | Host stage | Area where the host stage or a seat is located |
| Meeting place | Stage | Area where the stage or a seat is located |
| Classroom | Writing board | Area where the writing board or a seat is located |
| Studio | Stage | Area where the stage or a seat is located |
| Museum | Collection | Area where the collection or a passage is located |
| Exhibition hall | Exhibit | Area where the exhibit or a passage is located |
| Soccer field | Competition venue | Area where the competition venue or a seat is located |

TABLE 1-continued

| Venue model | Observation object | Observation area |
| --- | --- | --- |
| Basketball court | Competition venue | Area where the competition venue or a seat is located |
| Athletic field | Track | Area where the track or a seat is located |
| Zoo | Elephant | Area where the elephant or a monkey is located |
| Botanical garden | Golden Ball Cactus | Area where the Golden Ball Cactus or a Narcissus is located |
| Scenic area | Pergola | Area where the pergola or a waterfall is located |
| Plaza | Sculpture | Area where the sculpture or an open space is located |
| Ocean | Fish | Area where the fish or a dolphin is located |
| Space | Celestial body | Area where the celestial body or a dust is located |

The venue models, and the observation objects and the observation areas in the venue models in Table 1 are merely examples. A real application is not limited to the venue models, and the observation objects and the observation areas in the venue models, which are listed in Table 1. Furthermore, a venue model may have one or more observation objects. For example, observation objects of a venue model of a soccer field may include a competition venue and/or seat(s). Moreover, a real application is not limited to combinations of the venue models and the observation objects, and combinations of the venue models and the observation areas, as listed in Table 1. One skilled in the art can freely combine the venue models, the observation objects and the observation areas in Table 1 based on an actual need. For example, a venue model of a conference room can combine with a host stage, and may also combine with a screen. In other words, observation objects of the venue model of the conference room may include the host stage and the screen.

In implementations, the client terminal 202 may be a device having a storage function. The client terminal 10 may have a projection plane set stored therein. The projection plane set may include at least one projection plane. The client terminal 202 may establish correspondence relationship(s) between observation point identifier(s) and projection plane(s). An observation point identifier is used for uniquely identifying an observation point. The client terminal 202 may obtain a designated observation point identifier, obtain a projection plane corresponding to the designated observation point identifier based on the correspondence relationship(s) between the observation point identifier(s) and the projection plane(s), and project an observation object and/or an observation area onto the projection plane to obtain projection image(s) of the observation object and/or the observation area. The designated observation point identifier may be used for uniquely identifying a designated observation point. The designated observation point may an observation point that is determined through interactions between the client terminal 202 and a user. For example, the user may select a target seat from among seats in a movie hall of a cinema by interacting with the client terminal 202. The designated observation point may be the target seat, and the designated observation point identifier may be used for uniquely identifying the target seat. Specifically, the designated observation point identifier may be seat number of the target seat.

In implementations, the client terminal 202 may have a projection image set stored therein. The projection image set may include at least one projection image. The projection image may be an image that is formed from a projection of an observation object and/or an observation area onto a projection plane. The client terminal 202 may establish correspondence relationship(s) between projection image(s) and observation point identifier(s). The client terminal 202 may obtain a designated observation point identifier, obtain a projection image corresponding to the designated observation point identifier based on the correspondence relationship(s) between the projection image(s) and the observation point identifier(s), and present the projection image.

In implementations, the client terminal 202 may determine an observation point, determine a projection plane based on the observation point, project an observation object and/or an observation area onto the projection plane to obtain projection image(s) of the observation object and/or the observation area, and display the projection image(s).

In implementations, the client terminal 202 may present a virtual venue image interface using a display, receive an operation triggering instruction from a user via the interface of the virtual venue image interface, determine a designated observation point, and obtain a projection image based on the designated observation point. The virtual venue image interface may be the entire content presented by the display of the client terminal 202. The virtual venue image interface may include a virtual venue image. Specifically, the virtual venue image may be a portion of the virtual venue image interface, or may fill up the virtual venue image interface. The virtual venue image may be generated based on reference observation point(s) in a venue model. The venue model may be a model that is constructed by modeling venue data using a model creation algorithm. The model creation algorithm may include, but is not limited to, a grid-based algorithm, a data fitting algorithm, a simulated annealing algorithm, etc.

In a process of obtaining a projection image, the client terminal 202 may obtain a projection plane corresponding to a designated observation point identifier from a stored projection plane set based on correspondence relationships between observation point identifiers and projection planes, and project an observation object and/or an observation area onto the projection plane to obtain projection image(s) of the observation object and/or the observation area. Additionally or alternatively, the client terminal 202 may obtain a projection image corresponding to a designated observation point from a stored projection image set based on correspondence relationships between the observation point identifiers and projection images. Additionally or alternatively, the client terminal 202 may determine the projection plane based on the designated observation point, and project the observation object and/or the observation area onto the projection plane to obtain the projection image(s) of the observation object and/or the observation area.

Figure 3:
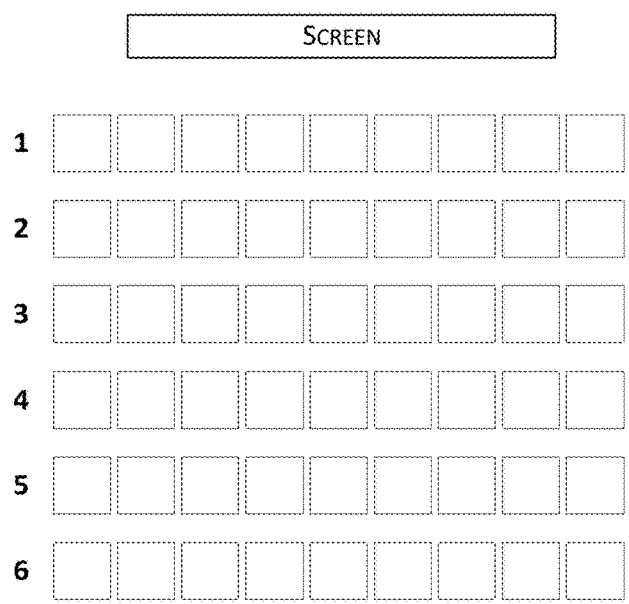
FIG. 3 shows a schematic diagram of a two-dimensional virtual venue image in accordance with the embodiments of the present disclosure.
Figure 4:
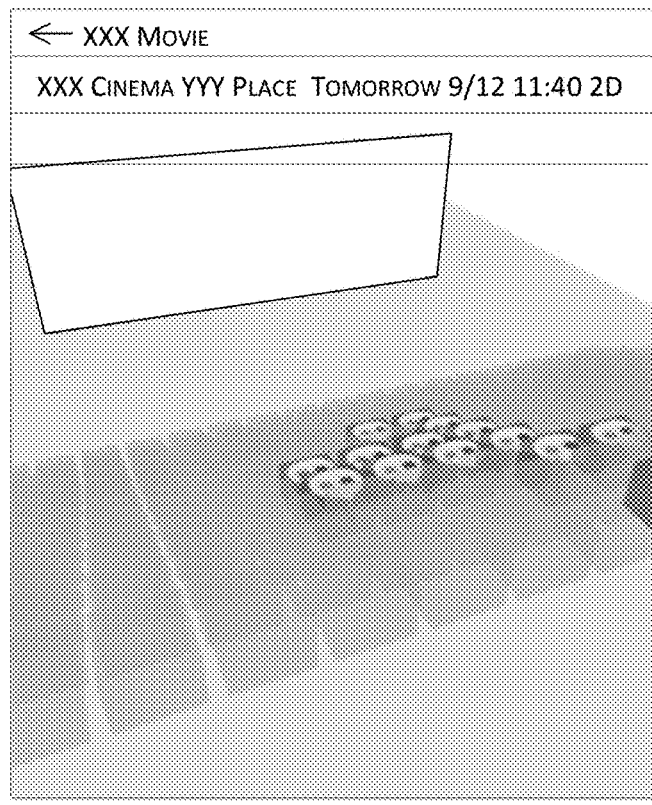
FIG. 4 shows a schematic diagram of a three-dimensional virtual venue image in accordance with the embodiments of the present disclosure.

In implementations, a space dimension of the venue model may be two-dimensional or three-dimensional, and a space dimension of the virtual venue image may also be two-dimensional or three-dimensional. Specifically, when the space dimension of the venue model is two-dimensional, a two-dimensional virtual venue image may be obtained by projecting the two-dimensional venue model onto a projection plane. Additionally or alternatively, the two-dimensional virtual venue image may further be converted into a three-dimensional virtual venue image through a two-dimensional image to a three-dimensional image conversion algorithm that is commonly used in the field of the present disclosure. When the space dimension of the venue model is three-dimensional, the three-dimensional venue model may be projected onto a projection plane to obtain a three-dimensional virtual venue image. Additionally or alternatively, the three-dimensional virtual venue image may be further converted into a two-dimensional virtual venue image through a three-dimensional image to a two-dimensional image conversion algorithm that is commonly used in the field of the present disclosure. For example, a two-dimensional virtual venue image 300 of a movie hall of a cinema venue may be the one as shown in FIG. 3, and a three-dimensional virtual venue image 400 of the movie hall of the cinema venue may be the one as shown in FIG. 4.

In implementations, the system may further include a server 204. The server 204 may be coupled to the client terminal 202. The sever 204 may be an independent server, or a server cluster that includes a plurality of servers.

In implementations, the client terminal 202 may present a virtual venue image interface using a display, receive an operation triggering instruction from a user via the virtual venue image interface, obtain a designated observation point identifier, and interact with the server 204 to obtain a projection image based on the designated observation point identifier.

In implementations, the server 204 may be a device having a storage capability. The server 204 may store a projection plane set. The projection plane set may include at least one projection plane. The server 204 may establish correspondence relationships between observation point identifiers and projection planes. The client terminal 202 may send a request for obtaining a projection plane to the server 204. The request may include a designated observation point identifier. The server 204 may receive the request, obtain a projection plane corresponding to the designated observation point identifier from the projection plane set based on the correspondence relationships between the observation point identifiers and the projection planes, and send the obtained projection plane to the client terminal 202. The client terminal 202 may receive the projection plane that is sent, and project an observation object and/or an observation area onto the projection plane to obtain projection image(s) of the observation point and/or the observation area.

In implementations, the server 204 may store a projection image set. The projection image set may include at least one projection image. The server 204 may establish correspondence relationships between projection images and observation point identifiers. The client terminal 202 may send a request for obtaining a projection image to the server 204. The request may include a designated observation point identifier. The server 204 may receive the request that is sent, obtain a projection image corresponding to the designated observation point identifier from the projection image set based on the correspondence relationships between the observation point identifiers and the projection images, and send the obtained projection image to the client terminal 202. The client terminal 202 may receive the projection image that is sent.

In an exemplary application scenario, the client terminal 202 may be a smartphone. The smartphone may have been installed with an application that is used for purchasing movie tickets. The server 204 may be a server corresponding to this application. The server 204 may act as an intermediary server. The smartphone, the intermediary server, and at least one server of a cinema form an online seat selection system. For example, the application may be a "MaoYan Movie" application. The intermediary server may be a server corresponding to the "MaoYan Movie" application. The server of the cinema may be a server of "Jinyi Cinema", a server of "Wanda Cinema", or a server of "China Film Stellar Theater Chain". The smartphone may conduct communications with the intermediary server. The intermediary server may conduct communications with the server or each cinema chain. The intermediary server may store information about cinemas of each cinema chain that can be selected by users, movie sessions of the cinemas, movie halls corresponding to the movie sessions, venue models of the movie halls, and ticket sales status data of the movie halls. The ticket sales status data may be used for describing information about seats that have been selected and seats that are available for selection in the movie halls. Furthermore, the intermediary server may also conduct communications with the server of each cinema chain in every predefined time interval, to perform synchronization of the movie sessions of the cinemas, the movie halls corresponding to the movie sessions, and the ticket sales status data of the movie halls that are stored.

Figure 10:
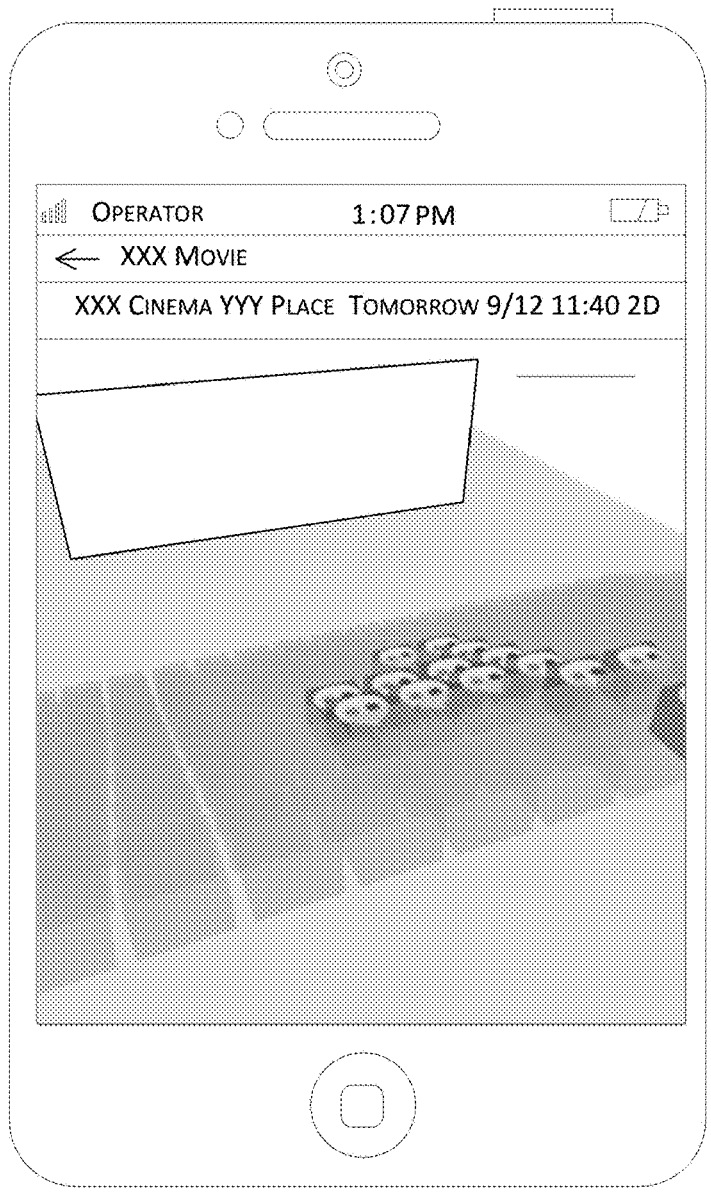
FIG. 10 shows a schematic diagram of a virtual venue image interface in accordance with the embodiments of the present disclosure.

In the instant application scenario, the user may open the application through the smartphone. The application may provide cinema(s) that is/are selectable by the user. After the user selects a cinema "Jinyi Cinema XXX place", the smartphone may send a request for obtaining movie sessions of "Jinyi Cinema XXX place" to the intermediary server. The intermediary server may receive the sent request, obtain the movie sessions of "Jinyi Cinema XXX place" based on stored information of cinemas of "Jinyi Cinema" that are selectable by users and movie sessions of the cinemas, and send the movie sessions to the smartphone. The smartphone may receive and present the sent movie sessions. After the user selects a "2:30 pm" movie session of a movie "Bounty Hunters", the smartphone may further send to the intermediary server a request for obtaining a movie hall corresponding to the "2:30 pm" movie session of the movie "Bounty Hunters", a venue model of the movie hall, and ticket sales status of the movie hall. The intermediary server may receive the sent request, obtain a venue model of "Number 6" movie hall and ticket sales status data of the "Number 6" movie hall based on the stored information of the movie hall corresponding to the movie session of "Jinyi Cinema", the venue model of the movie hall and the ticket sales status data of the movie hall, and send the venue model of the "Number 6" movie hall and the ticket sales status data of the "Number 6" movie hall to the smartphone. The "Number 6" movie hall is a movie hall corresponding to the "2:30 pm" movie session of the movie "Bounty Hunters" in "Jinyi Cinema XXX place". The smartphone may receive the ticket sales status data of the "Number 6" movie hall, and present a virtual venue image interface of the "Number 6" movie hall. In the virtual venue image interface, the smartphone may distinguish between seats that are already selected and seats that are available for selection in the movie hall based on the ticket sales status data of the "Number 6" movie hall. For example, the seats that have been selected may be displayed in red, and the seats that are available for selection may be displayed in blue. For another example, FIG. 10 shows a schematic diagram of a virtual venue image interface of the "Number 6" movie hall.

Figure 11:
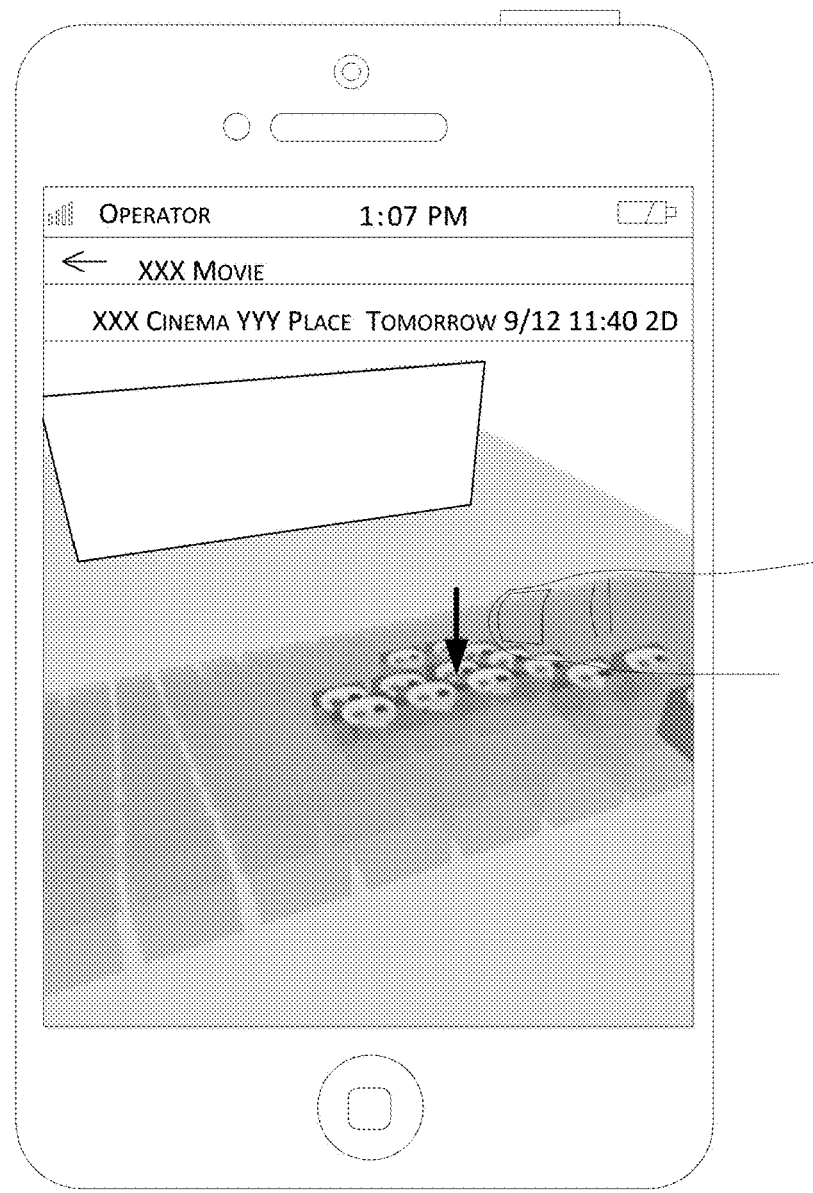
FIG. 11 shows a schematic diagram of seat selection in accordance with the embodiments of the present disclosure.
Figure 12:
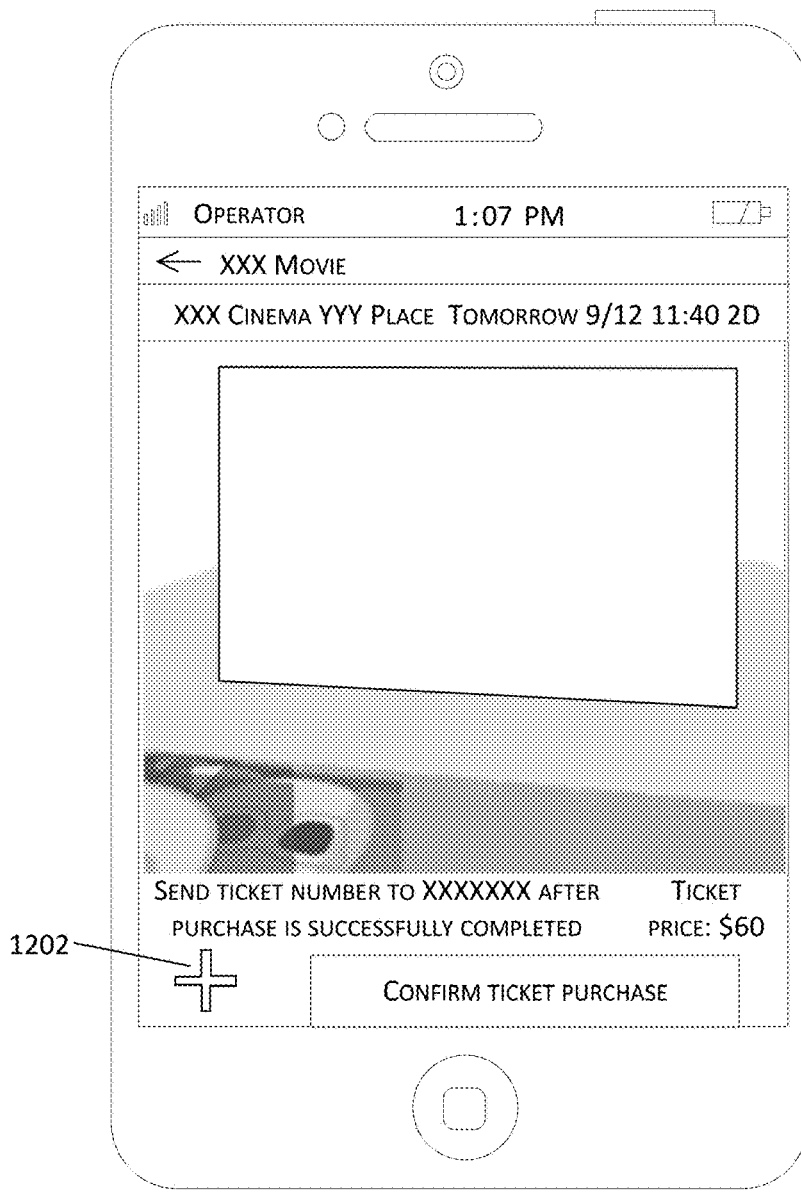
FIG. 12 shows a schematic diagram of a projection image of a screen corresponding to a seat in accordance with the embodiments of the present disclosure.

In the present application scenario, the user may select a target seat from the "Number 6" movie hall based on the virtual venue image interface of the "Number 6" movie hall. For example, FIG. 11 is a schematic diagram showing the user selecting a target seat via the virtual venue image interface that is presented. The smartphone may use the target seat as an observation point, and display a simulated screen state that is observed by a human from the target seat. For example, FIG. 12 shows a schematic diagram of a projection image of the screen corresponding to a seat in the middle of row number 6 in the "Number 6" movie hall. In FIG. 12, a screen state corresponding to the seat in the middle of the row number 6 is shown. Accordingly, the smartphone may display the screen state that is observed from the selected seat to the user, thus providing a good operating experience for the user to select a seat.

In another exemplary application scenario, the client terminal 202 may be a smartphone. The smartphone may be installed with an application that is used for browsing a scene of a scenic area. The server 204 may be a server corresponding to that application. The smartphone and the server 204 may form to be a scenic area browsing system. The server 204 may store a venue model of the scenic area. For example, the server 204 may store a venue model of a scenic area "Suzhou Gardens", a venue model of a scenic area "Forbidden City", etc.

In the instant application scenario, the user may open the application through the smartphone. The application may provide a scenic area that can be browsed by the user. After the user selects the scenic area of "Suzhou Gardens", the smartphone may send a request for obtaining the venue model of the scenic area of "Suzhou Gardens" to the server 204. The server 204 may receive the sent request, and send the venue model of the scenic area of "Suzhou Gardens" to the smartphone. The smartphone may receive the sent venue model of the scenic area of "Suzhou Gardens", and display a virtual venue image interface of the scenic area of "Suzhou Gardens" based on the venue model of the scenic area of "Suzhou Gardens".

In the present application scenario, the user may perform a clicking operation on the virtual venue image interface. After receiving the clicking operation of the user on the virtual venue image interface, the smartphone may obtain a triggering point of the clicking operation that is happened on the virtual venue image interface, obtain a corresponding point in the venue model of the scenic area of "Suzhou Gardens" corresponding to the triggering point, and set the corresponding point as an observation point. The smartphone may construct a projection plane based on the observation point and a designated distance that is defined in advance. The designated distance may be a distance between the observation point and the projection plane. A projection of the observation point on the projection plane may be close to a center area of the projection plane. The smartphone may determine an observation area based on the projection plane. Specifically, the smartphone may generate an observation area based on predefined observation area generation rule(s). The observation area generation rule(s) may include setting a predefined number of points. A line joining the observation point and each point of the predefined number of points may pass through the projection plane. A process of generating the observation area may include generating the observation area based on the predefined number of points. For example, a predefined number of boundary points may be set, so that a line joining the observation point and each boundary point passes through a boundary of the projection plane. The observation area can be generated based on the predefined number of boundary points. It can be understood that a line between the observation point and the boundary of the projection plane may form a conical body with the observation point as the vertex. The projection plane is used as a reference standard. The observation area may be located on the opposite side of the observation point, and is an area located within the conical body. A projection image of the observation area may be displayed. As such, a simulation of an area that is observed from a viewing angle of a human at the observation point may be implemented. The user can enjoy the scenery of the scenic area of "Suzhou Gardens" through the smartphone without the need of actually visiting the scenic area of "Suzhou Gardens".

In the present application scenario, the user may further perform a swiping operation on the projection image. After receiving the swiping operation of the user on the projection image, the smartphone may rotate the projection image with the observation point as the center. An angle of rotation may depend on a distance of swiping made by the user on the display of the smartphone, and a direction of rotation may be based on a direction of swiping of the user on the display of the smartphone. After rotating the projection image, a position of the observation area may be changed accordingly, and the projection image that is displayed may also be changed correspondingly. As such, a user may change an area to be observed by performing a swiping operation on a projection image, thus enjoying scenes of different observation areas from a same observation point. For example, the user may perform as swiping operation to the left by 500 pixels on the projection image, and the smartphone may rotate the projection image by 60° degree to the left.

In the present application scenario, the user may also perform a double-click operation on the projection image. In response to receiving the double-click operation of the user on the projection image, the smartphone may obtain a triggering point of the double-click operation, obtain a corresponding point in the venue model of the scenic area of "Suzhou Gardens" that corresponds to the triggering point, set the current observation point as a reference standard, obtain a distance and a direction of the corresponding point with respect to the current observation point, use the distance as a moving distance of the projection plane, use the direction as a moving direction of the projection plane, and move the projection plane according to the moving distance and the moving direction. After moving the projection plane, the position of the observation area may be changed accordingly, and the projection image that is displayed may also be changed correspondingly. As such, the user may change the area that is observed through performing a double-click operation on the projection plane, thus enjoying the scenes corresponding to different observation points.

Apparently, after receiving a double-click operation of the user on the projection image, the smartphone may also obtain a triggering point of the double-click operation, obtain a corresponding point in the venue model of the scenic area of "Suzhou Gardens" that corresponds to the triggering point, use the corresponding point as a new observation point, construct a new projection plane based on the new observation point, determine a new observation area based on the new projection plane, and project the new observation area onto the new projection plane to obtain a projection image of the new observation area. As such, the user can change an area to be observed by performing a double-check operation on a projection plane, and enjoy the scenes corresponding to different observation points.

In another exemplary application scenario, a user may select a seat online using a smart automated terminal. In this case, the smart automated terminal may act as the client terminal 202. The smart automated terminal may provide a virtual venue image interface of a venue to the user. The venue may include, but is not limited to, a movie hall of a cinema, a drama hall of a theater, a conference, a meeting place, a classroom, a studio, a soccer field, a basketball court, and an athletic field, etc. The user may select a target seat through the virtual venue image interface. The smart automated terminal may provide a projection image of an observation object corresponding to the target seat. As such, the user may know a viewing angle corresponding to the target seat. Combined with the implementations in the foregoing description, the smart automated terminal may store a projection image for each seat. As such, after the user clicks on a seat, the smart automated terminal may display a projection image corresponding to that seat. Alternatively, the smart automated terminal may also use the target seat as an observation point, determine a projection plane based on the observation point, and project an observation object in the venue onto the projection plane to obtain a projection image of the observation object.

Figure 5:
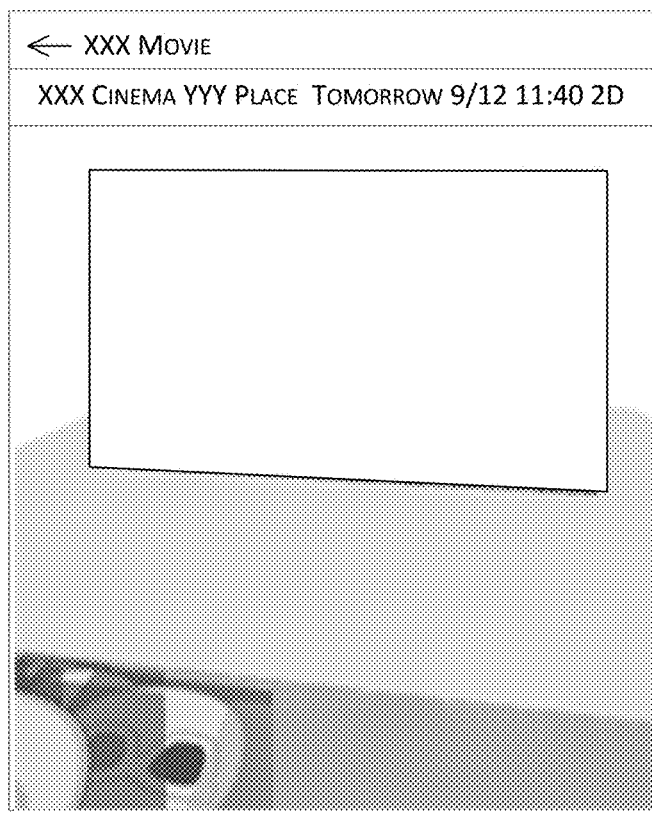
FIG. 5 shows a schematic diagram of a projection image of a screen corresponding to a seat in accordance with the embodiments of the present disclosure.
Figure 6:
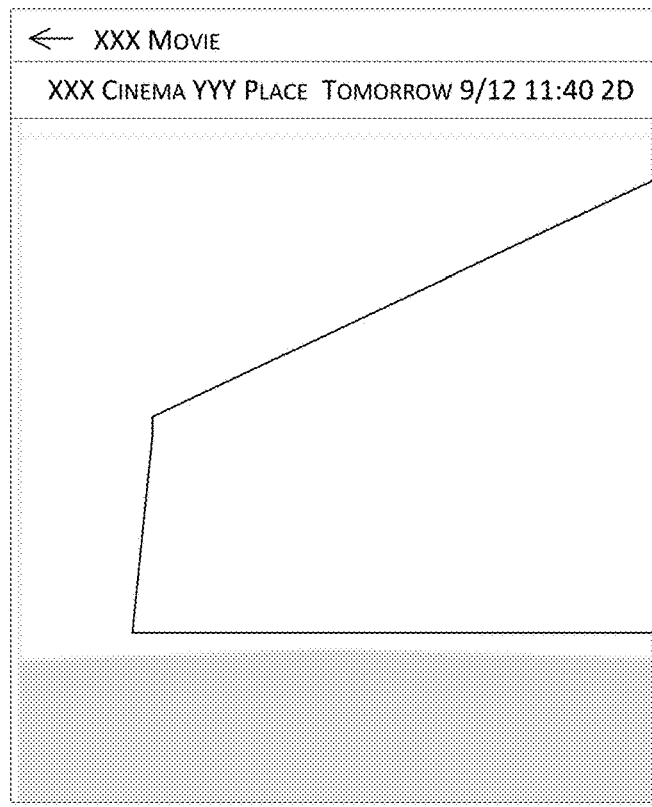
FIG. 6 shows a schematic diagram of another projection image of a screen corresponding to a seat in accordance with the embodiments of the present disclosure.

For example, a user may purchase a movie ticket using a smart automated terminal. The smart automated terminal may provide an interface of an image of a layout plan of a movie hall to the user. The user may select a target seat through the interface of the image of the layout plan. The smart automated terminal may use the target seat as an observation point, determine a projection plane based on the observation point, project a screen of the movie hall onto the projection plane to obtain a projection image of the screen, and display the projection image of the screen. Specifically, FIG. 5 shows a projection image 500 of a screen corresponding to a seat in the middle of the fourth row in a corresponding movie hall as shown in FIG. 3, for example. For another example, FIG. 6 shows a projection image 600 of the screen corresponding to a seat at the rightmost end of the first row as shown in FIG. 3. Similarly, the user may also use the smart automated terminal to purchase a ticket for a drama, a soccer game, a basketball game, or an athletic game, etc.

In another exemplary application scenario, a user may browse an observation object in a venue using a smartphone. The venue may include, but is not limited to, a museum, an exhibition hall, a zoo, a scenic area, a plaza, etc. The observation object may include, but is not limited to, a collection, an exhibit, a Golden Bal Cactus, a pergola, a sculpture, etc. The smartphone may be used as the client terminal 202. Specifically, the smartphone may provide a virtual venue image interface of the venue to the user. The user may determine an observation point through the virtual venue image interface. The smartphone may obtain the observation point determined by the user, determine a projection plane based on the observation point, project an observation object in the venue onto the projection plane to obtain a projection image of the observation object, and display the projection image of the observation object. In this way, the smartphone may present the observation object in the venue to the user. The user can obtain a same viewing effect as if being in the venue, without the need of actually being in the venue.

In another exemplary application scenario, a user may conduct a virtual visit in the space using a smartphone. In this case, the smartphone may be used as the client terminal 202. The smartphone may provide a virtual venue image interface of the space to the user. The user may determine an observation point through the virtual venue image interface. The smartphone may obtain the observation point determined by the user, determine a projection plane based on the observation point, project an observed celestial body and/or an observed space area onto the projection plane to obtain projection image(s) of the observed celestial body and/or the observed space area, and display the projection image(s) of the observed celestial body and/or the observed space area. In this way, the smartphone may provide the projection image(s) of the observed celestial body and/or the observed space area that correspond(s) to the observation point to the user. In other words, the user is provided with a viewing effect corresponding to the observation point. Similarly, the user may also conduct a virtual visit in an ocean using the smartphone.

Figure 7:
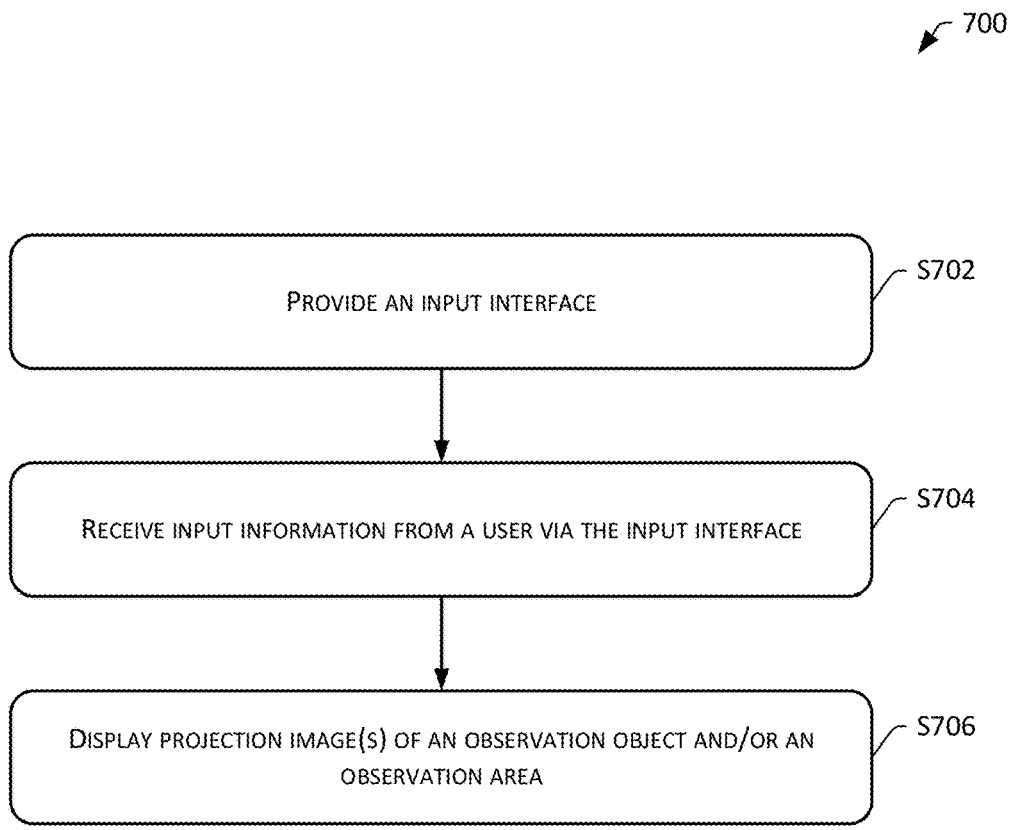
FIG. 7 shows a flowchart of an image display method in accordance with the embodiments of the present disclosure.

An implementation of an image display method in accordance with the present disclosure is described herein. Referring to FIG. 7, a client terminal is used as a main entity in this implementation, and the method 700 may include the following operations.

S702 provides an input interface.

In implementations, the input interface may be a virtual venue image interface displayed by the client terminal. In this case, a user may select and set an observation point in a more intuitive manner. The virtual venue image interface may include a two-dimensional or three-dimensional virtual venue image. Description of the virtual venue image interface can be referenced to the foregoing implementations. Apparently, the input interface may also provide an input field, and the input field may be used for receiving location information inputted by the user. Specifically, the input field may be used for inputting a seat in a scenario of seat selection, for example.

S704 receives input information of a user in the input interface, the input information being used for determining an observation point.

In implementations, the input information may an operation triggering instruction that happens in the virtual venue image interface. Specifically, the operation triggering instruction may be a clicking operation event. The input information may also be location information of an observation point inputted by the user in the input field. For example, the client terminal may provide a virtual venue image of a museum. The user may click on a certain position in the virtual venue image of the museum, to cause a clicking operation event. The clicking operation event may point to a certain location in the virtual venue image of the museum, and the location pointed by the clicking operation event may be used as an observation point. For another example, the input interface may provide three input fields, which are used for inputting an area number, a row number, and a seat number in a gymnasium respectively. A seat that is specified may be used as an observation point.

In implementations, the observation point may be used for generating a projection image. The projection image may be an image that is formed by projecting an observation object and/or observation area in a venue model onto a projection plane. The venue model may be a virtual space environment including one or more objects. Specifically, the venue model may be a model constructed by modeling venue data using a model creation algorithm. The model creation algorithm may include, but is not limited to, a grid-based algorithm, a data fitting algorithm, a simulated annealing algorithm, etc. The observation object may be an object to be projected in the venue model. The observation area may be used for simulating an area that is observed by a human from a human visual perspective in the venue model. The observation object may be located inside the observation area, or may be located outside the observation area.

The observation point may be used for simulating a location of observation of a human in the venue model. The projection image may be used for simulating a state of the observation object and/or the observation area that is/are observed by a human at the observation point. For example, the observation point may be a seat. The observation object may be a screen of a movie hall of a cinema. A projection image of the observation object may be used for simulating a state of the screen that is observed by a human at the position of the seat. For another example, the observation point may also be a point in the venue model. The observation object may also be a natural scenery. Specifically, the observation object may be a pergola of a scenic area or a sculpture of a plaza. A projection image of the observation object may be used for simulating a state of the natural scenery that is observed by a human at the position of the observation point.

In implementations, a process of determining an observation point may include receiving location information of an observation point inputted by a user, and determining the observation point based on the location information of the observation point. The location information of the observation point may be used for describing a location of the observation point. For example, the observation point may be a seat, and the location information of the observation point may be a seat number. The client terminal may provide an input interface of seat numbers, receive a seat number inputted by the user via the input interface, and set a seat corresponding to the seat number as an observation point.

In implementations, the client terminal may provide a virtual venue image interface. Correspondingly, the process of determining the observation point may also include receiving an operation triggering instruction of the virtual venue image interface, and obtain the observation point.

In implementations, the virtual venue image interface may include a virtual venue image. Specifically, the virtual venue image may be a portion of the virtual venue image interface, or may completely fill up the virtual venue image interface. The virtual venue image may be obtained based on the venue model. The client terminal may have the venue model. A portion of the venue model that is displayed in a display of the client terminal may be treated as the virtual venue image.

In implementations, the operation triggering instruction may be generated in response to detecting a clicking operation in the virtual venue image interface. The clicking operation may include a single-click operation, a double-click operation, etc. For example, the user may perform a single-click operation on the virtual venue image interface, and the operation triggering instruction may be generated in response to detecting the single-click operation on the virtual venue image interface. The single-click operation may be a single-click operation of a mouse pointer. Alternatively, for a client terminal having a touch screen, the single-click operation may also be a single-click operation of a touch by the user on the touch screen.

In implementations, a process of obtaining an observation point may include obtaining a triggering point at which a triggering operation occurs in the virtual venue image interface, obtain a corresponding point in a venue model that corresponds to the triggering point, and use the corresponding point as an observation point. The venue model is used for generating a virtual venue image in the virtual venue image interface. For example, the client terminal may be a device having a display. The client terminal may obtain a triggering point at which a triggering operation occurs in a virtual venue image interface, obtain a two-dimensional coordinate value of the triggering point in a device coordinate system, the device coordinate system being a two-dimensional rectangular coordinate system that is set up based on the display, convert the two-dimensional coordinate value of the triggering point into a three-dimensional coordinate value based on a predefined coordinate conversion algorithm, obtain a corresponding point of the three-dimensional coordinate value in a world coordinate system, and use the corresponding point as an observation point. The world coordinate system may be a three-dimensional Cartesian coordinate system that is established based on a venue model. The venue model is used for generating the virtual venue image in the virtual venue image interface.

In implementations, the virtual venue image interface may be generated based on reference observation points in the venue model. When the virtual venue image is generated in the venue model, the reference observation points may be used as a basis. The reference observation points may be set up in advance. When a virtual venue image is initially provided to a user, observation points that are relatively clear may be included. Apparently, the user may specify reference observation points to change content in a virtual venue image. For example, when a user opens an application, a virtual venue image that is generated based on reference observation points may be provided. In this case, the user may also specify a certain position in the virtual venue image, and a client terminal in which the application is situated may use this position as a current reference observation point. As such, the client terminal in which the application is situated may regenerate the virtual venue image based on the current reference observation point, and provide thereof to the user. In this case, the virtual venue image may also be changed correspondingly as the reference observation point is changed, thus facilitating the user to understand conditions of the venue model in a more comprehensive manner.

In implementations, the process of obtaining an observation point may also include obtaining a triggering point corresponding to an operation triggering instruction in a virtual venue image interface, obtaining a corresponding point that corresponds to the triggering point in a venue model, the venue model being used for generating a virtual venue image in the virtual venue image interface, construct a straight line based on the corresponding point and the reference observation point, analyzing distance(s) between object(s) and the straight line in the venue model, selecting an object having the shortest distance from the straight line from the venue model, and use the selected object as an observation point. The object may be a seat, a desk, for example. Apparently, when the object(s) and the straight line is/are analyzed, distance(s) between representative point(s) of the object(s) and the straight line may be analyzed. The representative point(s) may be respective center(s) or center(s) of mass of the object(s). Alternatively, a point may be assigned to each object in the venue model in advance, to represent respective location(s) of the object(s). In this way, the representative point(s) may also be point(s) set up in advance for the object(s).

S706 displays projection image(s) of an observation object and/or an observation area, the projection image(s) being image(s) that is/are formed by projecting the observation object and/or the observation area onto a projection plane.

In implementations, a projection plane corresponding to the observation point may be interpreted as a projection plane that is determined based on the observation point. The projection plane may be a flat surface or a curved surface. The curved surface may include, but is not limited to, a spherical surface, a cylindrical surface, a conical surface, for example. The projection plane may be determined based on positional relationship(s) between an observation object or an observation area in a venue model, and an observation point in the venue model. Specifically, a projection plane may be constructed between the observation object or the observation area, and the observation point. Projection image(s) of the observation object and/or the observation area on the projection plane may be obtained, to implement simulation of respective state(s) of the observation object and/or the observation area that is/are observed by a human at the observation point.

In implementations, a projection of the observation point on the projection plane may be close to a center area of the projection plane. The projection plane may be a rectangular plane. The projection of the observation point on the rectangular plane may be close to a center area of the rectangular plane.

In implementations, a specified distance may exist between the projection plane and the observation point. In this way, after the observation point is confirmed, the projection plane may be determined through the specified distance. The specified distance may be set up in advance based on conditions of a specific venue model. Apparently, the specified distance may also be obtained by calculated using a predefined distance assignment algorithm. The distance assignment algorithm may use a distance between an observation point and an observation object, or a distance between the observation point and an observation area, as an input parameter. The distance between the observation point and the observation object may be a distance between a geometrical center of the observation object and the observation point, or a distance between a center of mass of the observation object and the observation point, or a distance between a pre-specified reference point of the observation point and the observation point. The reference point of the observation object may be the center point of the observation object, and may apparently be another point. The distance between the observation point and the observation area may be a distance between the observation point and a geometrical center of a shape formed by the entire observation area, or a distance between a pre-specified reference point of the observation area and the observation point. The reference point of the observation area may be the center point of the observation area, and may apparently be another point. The distance assignment algorithm may decrease the input parameter, and use the reduced data as the distance between the observation point and the projection plane. For example, the input parameter may be decreased by a specific value, and for example, may be decreased by 1, 2, 3, 5, or 10, etc. Alternatively, the input parameter may be divided by a specific value. For example, the input parameter may be divided by 2, 3, 10, 20, etc.

In implementations, the client terminal may store projection plane(s) having a fixed size that is defined in advance. As such, after confirming an observation point, the client terminal may determine a location of a projection plane based on a specified distance between the projection plane and the observation point.

In implementations, the client may generate a projection plane based on a dynamic state of the observation point in accordance with a predefined projection plane spacing rule. The predefined projection plane spacing rule may include setting a reference point, and determining a projection plane based on the reference point and the observation point, the projection plane have an intersection with a straight line that joins the observation point and the reference point. An included angle between the projection plane and the straight line joining the observation point and the reference point may be any nonzero angle, such as 30°, 40°, 55°, 60°, or 90°.

Figure 8:
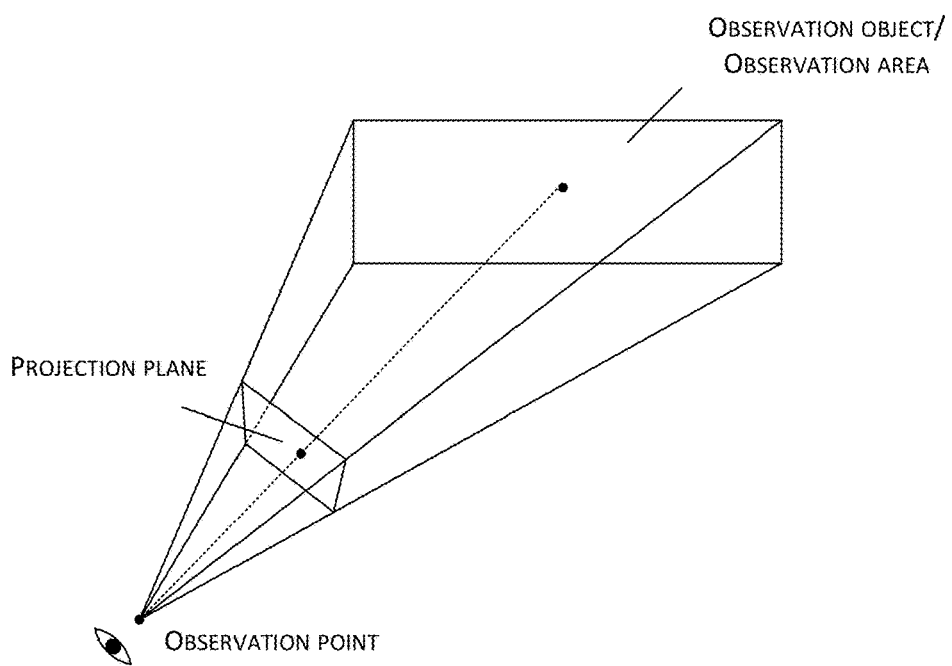
FIG. 8 shows a schematic diagram of a projection plane in accordance with the embodiments of the present disclosure.

A specific point of the projection plane may be located on a line that joins the reference point and the observation point. For example, FIG. 8 shows a schematic diagram of performing a space setting 800 for a position of a projection plane according to a predefined projection plane spacing rule. In FIG. 8, a black point of an observation object or an observation area may be set as a reference point. A black point of the center area of the projection plane may be set as a specific point. The black point of the projection plane may be located on a line joining the reference point and an observation point, to set and restrict a position for the projection plane. For another example, a venue model may be a movie hall of a cinema. A center point of a screen of the movie hall of the cinema may be set as a reference point. A center point of a projection plane may be set as a specific point. The center point of the projection plane may be set to locate on a line joining the reference point and an observation point, to set and restrict a position for the projection plane. Apparently, a position of a reference point is not limited to a center point of an observation object or an observation area, and may be another point. Correspondingly, a specific point of a projection plane may be set in the client terminal in advance. For example, the center of a projection plane may be set to be a specific point of the projection plane in the client terminal in advance. Correspondingly, a position of a specific point is not limited to the center of a projection plane, and may be other points on the projection plane.

In implementations, the client terminal may have projection plane(s) having fixed size(s) that is/are defined in advance. As such, the workload of the client terminal is reduced, leading to a relatively simple computing logic. Apparently, the client terminal may also generate a projection plane based on an observation point in accordance with a predefined projection plane generation rule. Specifically, a projection plane generated according to the predefined projection plane generation rule may fulfill the following criteria: the observation point and a boundary of the projection plane being connected and passing through a specific object in the venue model. For example, the venue model may be a soccer field, and the observation point is a certain seat. A specific object in the soccer field is a competition field. A connecting line between the observation point and the projection plane may pass through a boundary of the competition field. It can be understood that multiple connecting lines are formed between the observation point and the boundaries of the competition field, and may form a conical body with the observation point as the vertex. The projection plane may be located between the observation point and the competition field, and the boundaries of the projection plane may individually be located on various faces of the conical body that surround the competition field.

It can be understood that the present disclosure is not limited to the implementations of determining a projection plane that are described above. One skilled in the art can make other modifications under the insights of the technical essences of the present disclosure. As long as achieved functions and effects thereof are identical or similar to those of the present disclosure, they should be covered by the scope of protection of the present disclosure.

In implementations, the observation object may be a pre-specified object in a venue model, or may be an object that is specified by a user in the venue model. For example, if the venue model is a theater, an entire stage may be set to be the observation object by default. Alternatively, if the venue model is a movie hall of a cinema, a seat specified by a user in the movie hall may be set to be the observation object. If the venue model is an exhibition hall, a certain exhibit specified by a user may be set to be the observation object.

In implementations, the observation area may be a pre-specified area in the venue model. For example, an area in which a screen of a movie hall of a cinema is located may be set to be an observation area in advance. The observation area may include one or more objects. For example, the area in which the screen of the movie hall of the cinema may be set to be the observation area, which may include the screen and seat(s).

Alternatively, the observation area may also be determined based on the projection plane. Specifically, the smartphone may generate an observation area based on a predefined observation area generation rule. The predefined observation area generation rule may include setting a predefined number of points. Connecting line(s) between an observation point and the predefined number of points may pass through the projection plane. A process of generating an observation area may include generating an observation area based on the predefined number of points. For example, a predefined number of boundary points may be set up, to allow a connecting line between an observation point and each boundary point to pass through a boundary of the projection plane. An observation area may be generated based on the predefined number of boundary points. It can be understood that connecting lines between an observation point and a projection plane can form a conical body with the observation point as the vertex thereof. The projection plane is used as a reference standard. The observation area may be located opposite to the observation point, and may be located inside an area of the conical body. One skilled in the art may further make other modifications to the observation area generation rule. For example, a frustum model may further be set up in advance. A predefined number of points may be set to allow a connecting line between the observation point and each point to pass through the projection plane. The predefined number of points may be set as boundary points of a frustum. The frustum may be generated based on the boundary points and the predefined frustum model. An area surrounded by the frustum may be set to be the observation area.

In implementations, a predefined projection algorithm may be used to project an observation object and/or an observation area onto the projection plane to obtain projection image(s) of the observation object and/or the observation area. The projection algorithm may include, but is not limited to, a perspective projection algorithm, a central projection algorithm, a Mercator projection algorithm, etc. For example, a gluPerspective function or a glFrustum function in OpenGL may be used to project the observation object and/or the observation area onto the projection plane, to obtain projection image(s) of the observation object and/or the observation area.

Figure 9:
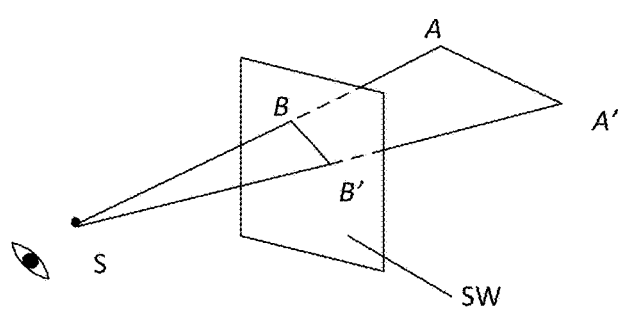
FIG. 9 shows a schematic diagram of a process of projection in accordance with the embodiments of the present disclosure.

In the process of projecting the observation object and/or the observation area, the observation point may be a center point of the projection. The center point of the projection may be an intersection of projecting lines. The projecting lines may be lines that pass through the observation point and points on the observation object, or lines that pass through the observation object and points inside the observation area. For example, FIG. 9 is a schematic diagram of a projection 900. In FIG. 9, an observation point is S, a projection plane is SW, an observation object is a line AA'. A projection image of the line AA' on the projection plane SW is a line BB'. The observation point S may be the center point of the projection, and projecting lines SA' and SA may be intersected with each other at the observation point S.

The observation area may include one or more objects. A process of projecting the observation area onto the projection plane to obtain the projection image of the observation area may include projecting the observation area and object(s) onto the projection plane to obtain the projection image of the observation area.

In the process of projecting the object(s) in the observation area onto the projection plane, if an overlap of projection images of at least two objects in the observation area on the projection plane occurs, a projection portion that has the overlap may be displayed with a projection image of an object that is closest to the projection plane from among the at least two objects.

In an exemplary application scenario, the client terminal may be a device having a display. The client terminal may obtain a size of the projection plane and a size of the display. Based on the size of the projection plane and the size of the display, the projection image(s) of the observation object and/or the observation area on the projection plane may be magnified or shrunk. The magnified or shrunken projection image(s) of the observation object and/or the observation area may be displayed via the display.

In another exemplary application scenario, the client terminal may be a device having a display. The client terminal may obtain coordinates of projection of the projection image(s) of the observation object and/or the observation area in a coordinate system of the projection plane. The coordinate system of the projection plane may be a two-dimensional coordinate system that is established based on the projection plane. The coordinate of projection may be converted into device coordinates in a device coordinate system based on a predefined coordinate conversion algorithm. The projection image(s) of the observation object and/or the observation area may be displayed on the device coordinates. The device coordinate system may be a two-dimensional coordinate system that is established based on the display.

In implementations, the method may further include receiving an instruction of display adjustment operation from the user to move the projection plane, determining an observation area based on the moved projection plane, and project the determined observation area onto the projection plane to obtain a projection image of the observation area. As such, the user can change an area for viewing through an operation on the projection plane.

In implementations, the instruction of display adjustment operation may be generated I response to detecting a clicking or swiping operation on the projection image. The clicking operation may be a single-click operation or a double-click operation.

In implementations, the client terminal may receive an instruction of display adjustment operation from the user, establish a moving vector according to the instruction of display adjustment operation, and move the projection plane according to the moving vector. The moving vector may include at least one of a moving distance, a moving angle, or a moving direction, etc.

The moving distance may be a pre-specified distance. As such, when a display adjustment operation occurs, the projection plane may be moved by the pre-specified distance. Apparently, a moving distance may also be generated according to the instruction of display adjustment operation. For example, the display adjustment operation may be a clicking operation. In this way, a triggering point at which a clicking operation occurs may be obtained, and a corresponding point in a venue model that corresponds to the triggering point may be obtained. The venue model may be used for generating a virtual venue image in a virtual venue image interface. A distance between the corresponding point and a current observation point may be obtained, and may be used as a moving distance of a projection plane.

The moving angle may be an angle or rotation of the projection plane. The angle of rotation may be a pre-specified angle. In this way, when a display adjustment operation occurs, the projection plane may be rotated by the pre-specified angle. Apparently, the angle of rotation may also be generated according to the instruction of display adjustment operation. For example, the display of the client terminal may be a touch screen, and the display adjustment operation may be a swiping operation. In this way, a mapping between swiping distances received from a user on the display and angles of rotation may be established in advance. When the user performs a swiping operation on the display, an angle of rotation can be calculated based on a swiping distanced made by the user on the display and the mapping. When a projection plane is rotated, an observation point may be used as the center of rotation for performing the rotation, Alternatively, a certain straight line in the projection plane may be used as the center of rotation. Alternatively, a rotation reference outside the projection plane may be specified in advance for performing the rotation.

The moving direction may be obtained based on the instruction of display adjustment operation. Specifically, the moving direction may be a direction indicated by the instruction of display adjustment operation that is received. For example, the display of the client terminal may be a touch screen, and the display adjustment operation may be a swiping operation. In this way, a direction in which the user performs a swipe on the display is set to be the moving direction. For example, the display adjustment operation may be a double-click operation. In this way, a triggering point at which the double-chick operation occurs may be obtained. A corresponding point in a venue model that corresponds to the triggering point may be obtained. The venue model may be used for generating a virtual venue image in a virtual venue image interface. A current observation point may be used as a reference standard to obtain a direction of the corresponding point with respect to the current observation point, which may be used as the moving direction of the projection plane.

In implementations, a process of determining an observation area based on a projection plane that has been moved may include moving the observation area based on the established moving vector. As such, after the projection plane is moved, a position of the observation area may be changed accordingly. Apparently, the present disclosure does not impose any limitation on an order of moving a projection plane and an observation area. For example, after establishing a moving vector, the projection plane may first be moved according to the moving vector, and then the observation area is moved. Alternatively, both the projection plane and the observation area may be moved based on the moving vector at the same time. Furthermore, in the process of determining the observation area based on the projection plane that has been moved, a method similar to that of S706 may also be used. A new observation area may be regenerated based on the observation area generation rule and the moved projection plane.

In implementations, the determined observation plane is projected onto the moved projection plane to obtain a projection image of the observation area. The projection image of the observation area is displayed. As such, after moving the projection plane, the displayed projection image may be changed accordingly. States of different observation areas can be provided to the user, and thereby areas observed by the user can be changed.

In implementations, the client terminal may be a mobile smart terminal. The mobile smart terminal may be integrated with angular rate sensor (or also called gyroscope). The angular rate sensor may be used for measuring a rate of angular change when being deflected or tilted. When the user change the state of deflection of the client terminal, the angular rate sensor may detect a deflection or tilting operation of the user, such that the client terminal can use an input signal produced by the angular rate sensor as an instruction of display adjustment operation. The client terminal can generate a moving vector based on the input signal. The moving vector may include at least one of a moving distance, a moving angle, or a moving direction. A projection plane can be moved according to the moving vector. An input signal can correspond to a moving direction when indicating that the client terminal is rotated along a horizontal axis. An input signal can correspond to a moving angle when indicating that the client terminal is rotated along a vertical axis. A strength of an input signal may correspond to a moving distance. As such, the user can change an area to be observed by rotating and/or shaking the client terminal, thus bringing convenience to the user.

Alternatively, the mobile smart terminal may be integrated with an accelerometer. The accelerometer may be used for measuring a moving direction and a moving speed change. When the user changes the state of the client terminal, the accelerometer can detect a rate of change of velocity of an associated movement. The rate of change of velocity of the movement may be used for describing the moving direction and the moving speed change. As such, the client terminal can an input signal generated by the accelerometer as an instruction of display adjustment operation. After receiving the instruction of display adjustment operation, a moving distance and a moving direction can be generated based on the input signal. A projection plane may be moved based on the moving distance and the moving direction. For example, the strength of the input signal may be used for representing a speed change of the client terminal, which may correspond to the moving distance. Positive and negative values of the input signal may be used for representing the moving direction of the client terminal on a straight line, which may correspond to moving in back and forth directions, or moving in left and right directions. In this way, the user can move an area to be observed forwards/backwards or left/right by shaking or waving the client terminal, thus bringing convenience to the user.

In implementations, the projection image may be located on a projection image interface. The projection image interface may include at least one trigger control. The user can move the projection plane by clicking or swiping the at least one trigger control. For example, the projection image interface may be configured with a first trigger control and a second trigger control. A left region of the first trigger control may correspond to moving in a left direction, and a right region of the first trigger control may correspond to moving in a right direction. A top region of the trigger control may correspond to moving in a forward direction, and a bottom region of the trigger control may correspond to moving in a backward direction. A left region of the second trigger control may correspond to a rotation to the left, and a right region of the second trigger control may correspond to a rotation to the right. A top region of the second trigger control may correspond to a rotation from the bottom to the top, and a bottom region of the second trigger control may correspond to a rotation from the top to the bottom. A triggering time duration of the second trigger control may correspond to an angle of rotation. For example, the projection image interface may also be configured with a voice control. The user may click on the voice control to input voice information. The client terminal may receive the voice information inputted by the user, establish a moving vector based on the voice information, and move the projection plane accordingly.

In implementations, the client terminal may present the projection image that is obtained on the display. As such, the user can know the state of the observation object and/or the observation area that is observed at the observation point via the display. For example, when purchasing a ticket via the client terminal and selecting a seat, the user can view a state of a screen with the selected seat as an observation point, thus providing a good experience of operation of seat selection for the user.

In implementations, by determining an observation point, the user client can provide a simulated viewing angle of a human at the observation point. As such, a user can know state(s) of an observation object and/or an observation area that is/are observed from the observation point without actually being at a venue thereof, thus bringing convenience to the user.

Figure 13:
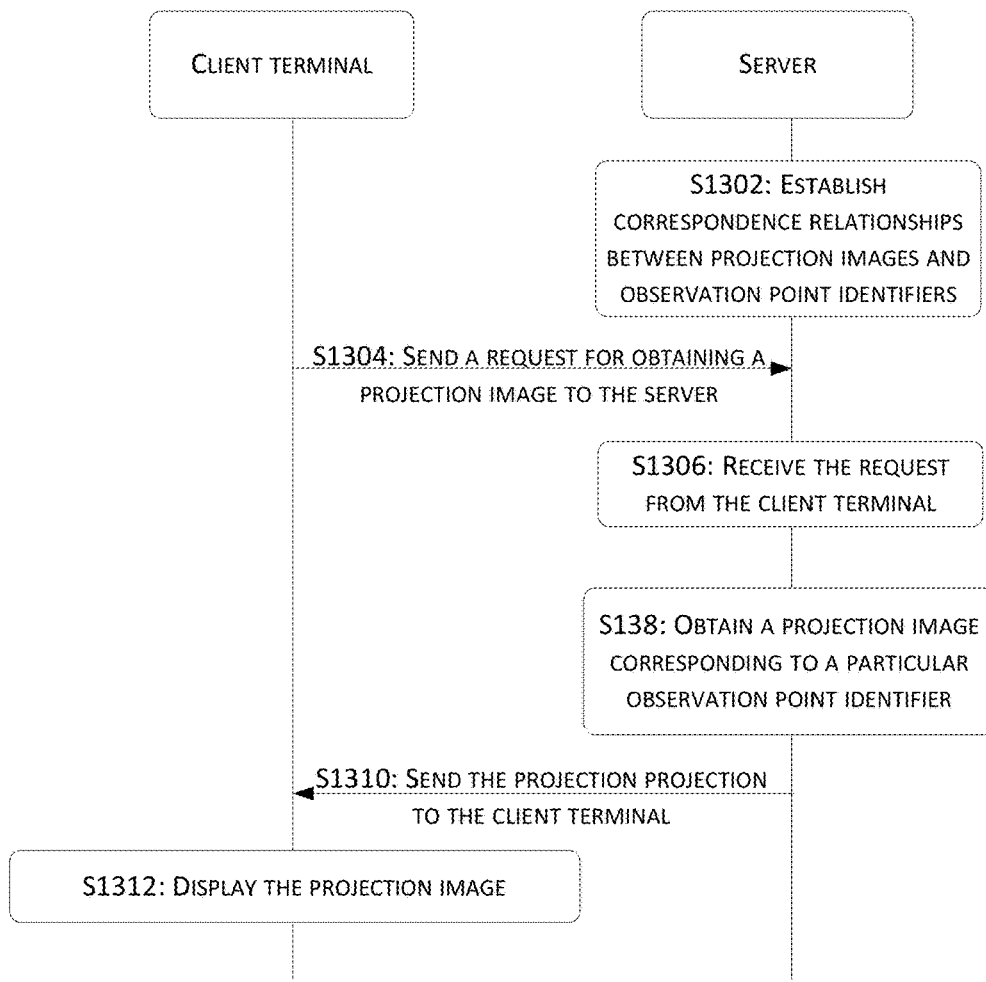
FIG. 13 shows a flowchart of another image display method in accordance with the embodiments of the present disclosure.

Another exemplary image display method in accordance with the present disclosure is described herein. In FIG. 13, the exemplary method 1300 may include the following operations.

At S1302, a server establish correspondence relationships between projection images and observation point identifiers, the projection images being images that are formed by projecting observation object(s) and/or observation area(s) onto projection plane(s), and the observation point identifiers being used for uniquely identifying individual observation points.

In implementations, the projection images may be generated by the server in advance. Description of a process of generating a projection image can be referenced to the foregoing description.

In implementations, an observation point identifier is used for uniquely identifying an observation point. For example, the observation point may be a seat, and the observation point identifier may be used for uniquely identifying the seat. Specifically, the observation point identifier may be a seat number.

In implementations, the server may store a projection image set. The projection image set may include at least one projection image. The server may establish a one-to-one correspondence between a projection image in the projection image set and an observation point identifier.

At S1304, a client terminal sends a request for obtaining a projection image to the server, the request including a particular observation point identifier.

In implementations, the particular observation point identifier may be used for uniquely identifying a particular observation point. The particular observation point may be an observation point that is determined by the client terminal through interactions with a user. For example, a user may select a seat from a movie hall of a cinema through interactions with the client terminal. The particular observation point may be a seat selected by the user. The particular observation point identifier may be used for uniquely identifying the seat selected by the user. Specifically, the particular observation point identifier may be a seat number of the seat selected by the user.

At S1306, the server receives the request sent by the client terminal.

At S1308, the server obtains a projection image corresponding to the particular observation point identifier based on the correspondence relationships between the projection images and the observation point identifiers.

At S1310, the server sends the projection image to the client terminal.

At S1312, the client terminal receives the projection image, and displays the projection image.

In an exemplary application scenario, the observation point may be a seat in a movie hall of a cinema. The observation point identifier may be a seat number. The server may store a projection image of a screen corresponding to each seat in the movie hall of the cinema. The projection image of the screen may be generated in advance. The server may establish one-to-one correspondence relationships between the projection images of the screen and respective seat numbers. A user can select a seat from the movie hall of the cinema by interacting with a client terminal. The client terminal may send a request for obtaining a projection image of a screen to the server. The request may include a seat number of the seat that is selected by the user. The server may receive the seat number of the seat selected by the user, obtain a projection image of the screen corresponding to the seat number of the seat selected by the user based on the one-to-one correspondence relationships between the projection images of the screen and the seat numbers, and send the projection image of the screen to the client terminal. The client terminal may receive and display the projection image of the screen.

In implementations, the server may establish a correspondence relationship between a projection image and an observation point identifier. The client terminal may send a request to the server, and obtain the projection image. As such, the client terminal may not need to perform projection, and thus can reduce workload and increase the speed of processing.

In implementations, the server may respond to a request for obtaining a projection image from a client terminal, and send a projection image corresponding to a particular observation point identifier included in the request to the client terminal. In this way, the client terminal can have a less data amount. Furthermore, projection images in the server may also be provided to different client terminal, and thus the utilization rate of the projection images is increased.

Figure 14:
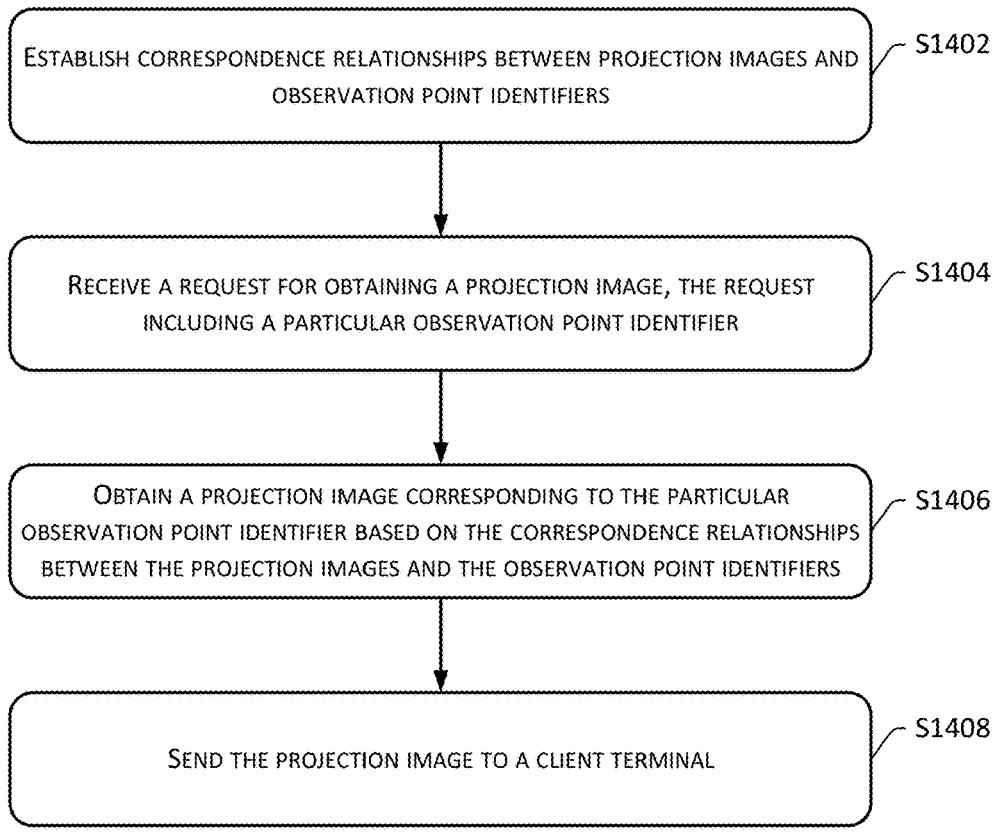
FIG. 14 shows a flowchart of an image sending method in accordance with the embodiments of the present disclosure.

An exemplary image sending method in accordance with the present disclosure is described herein. In FIG. 14, a server is used as a main entity, and the exemplary method 1400 may include the following operations.

S1402 establishes correspondence relationships between projection images and observation point identifiers, the projection images being images that are formed by projecting observation object(s) and/or observation area(s) onto projection plane(s), and the observation point identifiers being used for uniquely identifying individual observation points.

S1404 receives a request for obtaining a projection image, the request including a particular observation point identifier.

S1406 obtains a projection image corresponding to the particular observation point identifier based on the correspondence relationships between the projection images and the observation point identifiers.

S1408 sends the projection image to the client terminal.

Figure 15:
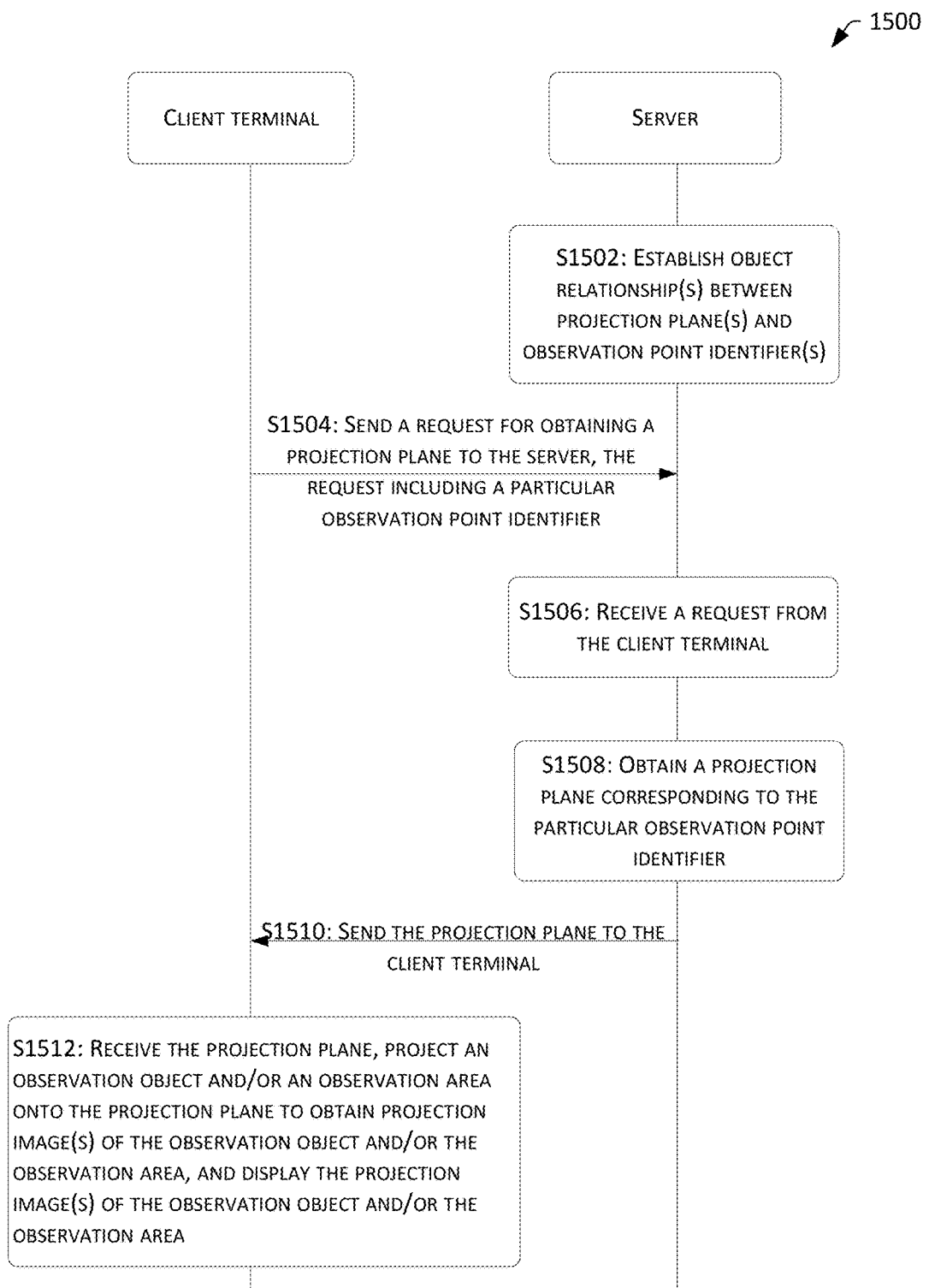
FIG. 15 shows a flowchart of another image sending method in accordance with the embodiments of the present disclosure.

Another exemplary image display method in accordance with the present disclosure is described herein. Referring to FIG. 15, the exemplary method 1500 may include the following operations.

At S1502, a server establishes object relationship(s) between projection plane(s) and observation point identifier(s).

In implementations, description of a projection plane can be referenced to the foregoing description.

In implementations, an observation point identifier can be used for uniquely identifying an observation point. For example, an observation point may be a seat, and an observation point identifier may be used for uniquely identifying the seat. Specifically, an observation point identifier may be a seat number.

In implementations, the server may store a projection plane set. The projection plane set may include at least one projection plane. The server may establish correspondence relationship(s) between the at least one projection plane in the projection plane set and observation point identifier(s).

At S1504, a client terminal sends a request for obtaining a projection plane to the server, the request including a particular observation point identifier.

In implementations, the particular observation point identifier may be used for uniquely identifying a particular observation point. The particular observation point may be an observation point that is determined by the client terminal via interactions with a user. For example, a user may select a seat from a movie hall of a cinema through interactions with the client terminal. The particular observation point may be the seat selected by the user, and the particular observation point identifier may be used for uniquely identifying the seat selected by the user. Specifically, the particular observation point identifier may be a seat number of the seat selected by the user.

At S1506, the server receives a request from the client terminal.

At S1508, the server obtains a projection plane corresponding to the particular observation point identifier based on the object relationship(s) between the projection plane(s) and the observation point identifier(s).

At S1510, the server sends the projection plane to the client terminal.

At S1512, the client terminal receives the projection plane, projects an observation object and/or an observation area onto the projection plane to obtain projection image(s) of the observation object and/or the observation area, and displays the projection image(s) of the observation object and/or the observation area.

In implementations, respective descriptions of the observation object, the observation area and the projection process may be referenced to the foregoing descriptions.

In an exemplary application scenario, the observation point may be a seat in a movie hall of a cinema. The observation point identifier may be a seat number. The server may store a projection plane corresponding to each seat in the movie hall of the cinema. The projection plane may be generated in advance. The server may establish one-to-one correspondence relationships between projection planes and seat numbers. A user may select a seat from the movie hall of the cinema by interacting with a client terminal. The client terminal may send a request to the server for obtaining a projection plane. The request may include a seat number of the seat selected by the user. The server may receive the seat number of the seat selected by the user, obtain a projection plane corresponding to the seat number of the seat selected by the user based on the one-to-one correspondence relationships between the projection planes and the seat numbers, and send the projection plane to the client terminal. The client terminal may receive the projection plane, project a screen of the movie hall of the cinema onto the projection plane to obtain a projection image of the screen, and display the projection image of the screen.

In implementations, the server may establish object relationships between projection planes and observation point identifiers. A client terminal may obtain a projection plane by sending a request to the server, and obtain a projection image based on the projection plane. In this way, the client terminal does not need to determine a projection plane, and thus can reduce workload and increase the speed of processing.

Figure 16:
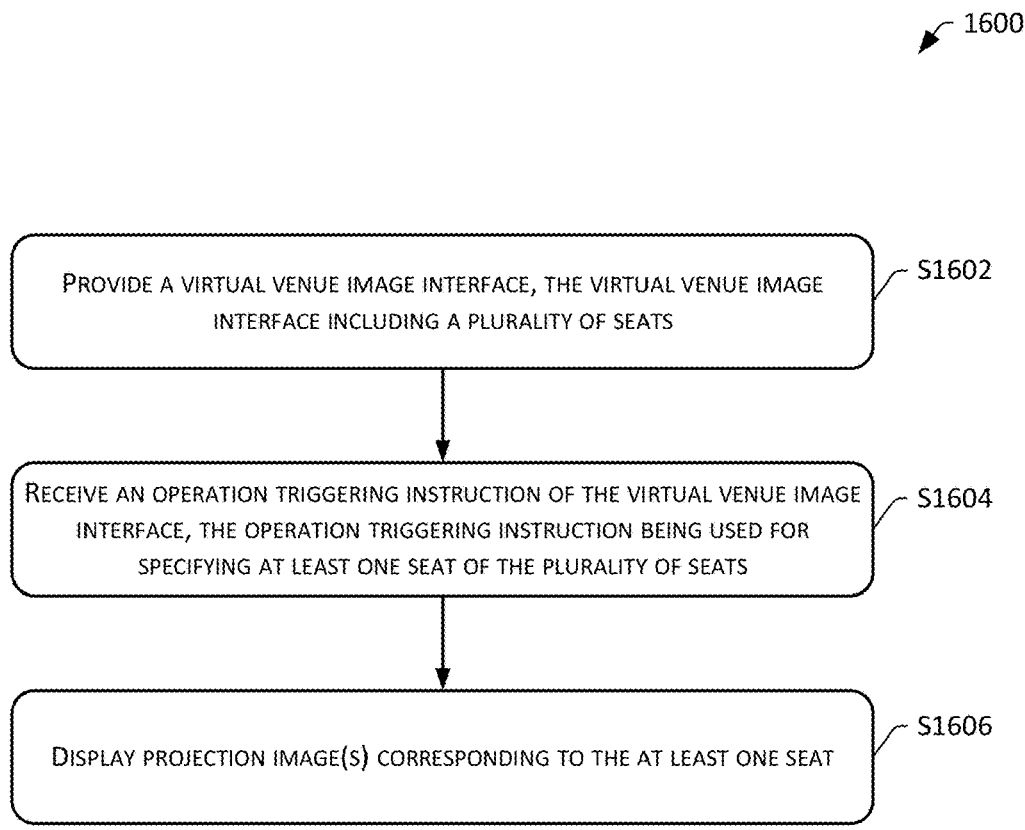
FIG. 16 shows a flowchart of another image sending method in accordance with the embodiments of the present disclosure.

FIG. 16 shows an exemplary image display method 1600 in accordance with the present disclosure. A client terminal is used as a main entity, and the exemplary method 1600 may include the following operations.

S1602 provides a virtual venue image interface, the virtual venue image interface including a plurality of seats.

In implementations, a client terminal can provide a function of online seat selection to a user. The client terminal can be used in venues including, but not limited to, a movie hall of a cinema, a drama hall of a theater, a stadium, a studio, a tea house, a restaurant, etc. The user can view an observed state of an observation object or an observation area via the client terminal.

In implementations, the virtual venue image interface may include a virtual venue image. The plurality of seats may be located in the virtual venue image. The virtual venue image may be a portion of the virtual venue image interface, or may completely fill up the virtual venue image interface. For example, FIG. 10 shows a schematic diagram of a virtual venue image interface 1000 of a movie hall of a cinema.

In implementations, the virtual venue image interface may also include an observation image and/or an observation area. Specifically, the virtual venue image interface may include a virtual venue image. The observation object and/or the observation area may be located in the virtual venue image. Respective descriptions of the observation object and the observation area can be referenced to the foregoing description.

S1604 receives an operation triggering instruction of the virtual venue image interface, the operation triggering instruction being used for specifying at least one seat of the plurality of seats.

In implementations, the operation triggering instruction may be generated in response to detecting a click-down operation, a single-click operation, or a double-click operation on the virtual venue image interface.

In implementations, the operation triggering instruction pointing to at least one seat may represent that the client terminal selecting the at least one seat from the plurality of seats via the operation triggering instruction. Specifically, the client terminal may obtain a triggering point in the virtual venue image interface at which a triggering operation occurs, obtain a corresponding point in a venue model that corresponds to the triggering point, the venue model being used for generating a virtual venue image in the virtual venue image interface, construct a straight line based on the corresponding point and a reference observation point, analyze respective distances between a plurality of seats and the straight line in the venue model, and select at least one seat from the plurality of seats based on the respective distance between each seat in the plurality of seats and the straight line.

A process of selecting the at least one seat from the plurality of seats may include selecting a seat having the shortest distance from the straight line, or selecting seat(s) having a distance from the straight line being less than a predefined distance. The predefined distance may be a distance that is defined for selecting a seat in advance, and a size thereof may be set based on actual needs. The process of selecting the at least one seat from the plurality of seats may be referenced and compared with the process of determining an observation point. For example, FIG. 11 is a schematic diagram of seat selection 1100.

S1606 displays projection image(s) corresponding to the at least one seat, the projection image(s) corresponding to the seat being image(s) that is/are formed by projecting an observation object and/or an observation area onto a projection plane corresponding to the seat.

In implementations, when the number of seats pointed by the operation triggering instruction is two or more than two, projection images of two or more than two seats may be displayed. Alternatively, a projection image of a seat may first be displayed, and a projection image of another seat may be displayed in response to detecting a shifting operation inputted by the user. For example, the shifting operation may be generated in response to detecting a sliding operation, or may also be generated in response to detecting an input of a signal of an angular rate sensor. For example, FIG. 12 is a schematic diagram of a projection image 1200 corresponding to a seat in the middle of the sixth row in a movie hall of a cinema. In FIG. 12, the state of a screen corresponding to the seat in the middle of the sixth row is displayed.

In implementations, upon receiving the operation triggering instruction of the virtual venue image interface, the method may further include individually determining a projection plane corresponding to each seat in the at least one seat, and individually project the observation object and/or the observation area onto the projection plane of each seat to obtain a projection image corresponding to the respective seat. The projection plane corresponding to each seat may be located between the respective seat and the observation object, or may be located between the respective seat and the observation area.

The process of individually determining the projection plane corresponding to each seat in the at least one seat may include individually determining the projection plane corresponding to each seat in the at least one seat based on a specified distance, the specified distance being a distance between a seat and a projection plane corresponding to the seat. Alternatively, a reference point may be set. The reference point may be a center point of the observation object or the observation area. Alternatively, other points may be used. Correspondingly, the process of individually determining the projection plane corresponding to each seat in the at least one seat may include individually determining the projection plane corresponding to each seat in the at least one seat based on the reference point, the projection plane corresponding to the respective seat and a straight passing the seat and the reference point being intersected with each other.

In implementations, a projection image corresponding to a seat may be used as a reference seat. The method may further include receiving a display adjustment operation instruction from the user, the display adjustment operation instruction being used for generating a change vector of the reference seat, and the change vector including at least one of a moving distance or a moving direction; changing the reference seat based on the change vector; and displaying a projection image corresponding to the changed reference seat. A process of generating a change vector may be referenced and compared with the process of establishing a moving vector. Furthermore, a process of changing a reference seat based on a change vector may also be referenced and compared with the process of moving a projection plane based on a moving vector.

For example, in FIG. 12, the projection image may be located on a projection image interface. The projection image interface may be configured with a trigger control 1202. A left region of the trigger control 1202 may correspond to moving to the left, and a right region of the trigger control 1202 may correspond to moving to the right. A top region of the trigger control 1202 may correspond to moving forward, and a bottom region of the trigger control 1202 may correspond to moving backward. A triggering time duration may correspond to a moving distance. Specifically, a user may perform a single-click operation on the left region of the trigger control 1202. The moving direction may be a left direction, and the moving distance may be a single seat. As such, a seat that is on the left hand side of the reference seat and is adjacent to the reference seat may be set as the reference seat after the change. For another example, the client terminal may also set a predefined reference time. When a time duration for the user to press down the left region of the trigger control 1202 is two times of the predefined reference time, the moving direction may be a left direction, and the moving direction may be two seats. In this way, a seat, which is on the left hand side of the reference seat and is separated from the reference seat by one seat, may be set to be the reference seat after the change.

Figure 17:
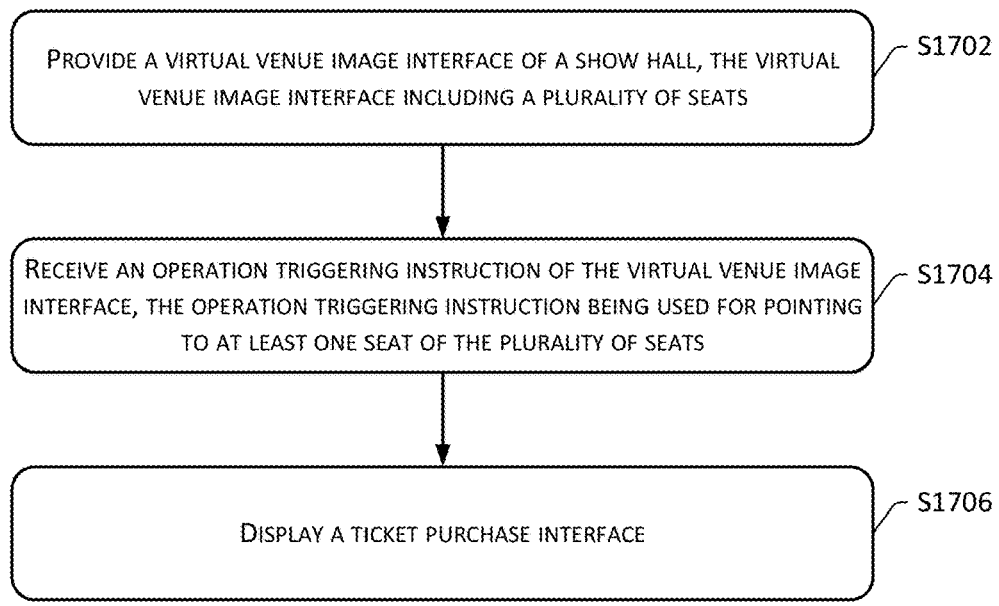
FIG. 17 shows a flowchart of a seat selection method in accordance with the embodiments of the present disclosure.

FIG. 17 shows an exemplary image display method 1700 in accordance with the present disclosure. The exemplary method 1700 uses a client terminal as a main entity, and may include the following operations.

S1702 provides a virtual venue image interface of a show hall, the virtual venue image interface including a plurality of seats.

In implementations, the show hall may include, but is not limited to, a movie hall of a cinema, a drama hall of a theater, a studio, etc.

In implementations, the virtual venue image interface may include a virtual venue image. The plurality of seats may be located in the virtual venue image. The virtual venue image may be a portion of the virtual venue image interface, or may completely occupy the virtual venue image interface. For example, FIG. 10 is a schematic diagram of a virtual venue image interface 1000 provided for a movie hall of a cinema.

S1704 receives an operation triggering instruction of the virtual venue image interface, the operation triggering instruction being used for pointing to at least one seat of the plurality of seats.

In implementations, the operation triggering instruction may be generated in response to detecting a click-down operation, a single-click operation, or a double-click operation on the virtual venue image interface.

In implementations, the operation triggering instruction pointing to at least one seat may represent that the client terminal selecting the at least one seat from the plurality of seats via the operation triggering instruction. Specifically, the client terminal may obtain a triggering point in the virtual venue image interface at which a triggering operation occurs, obtain a corresponding point in a venue model that corresponds to the triggering point, the venue model being used for generating a virtual venue image in the virtual venue image interface, construct a straight line based on the corresponding point and a reference observation point, analyze respective distances between a plurality of seats and the straight line in the venue model, and select at least one seat from the plurality of seats based on the respective distance between each seat in the plurality of seats and the straight line.

A process of selecting the at least one seat from the plurality of seats may include selecting a seat having the shortest distance from the straight line, or selecting seat(s) having a distance from the straight line being less than a predefined distance. The predefined distance may be a distance that is defined for selecting a seat in advance, and a size thereof may be flexibly set based on actual needs. The process of selecting the at least one seat from the plurality of seats may be referenced and compared with the process of determining an observation point. For example, FIG. 11 is a schematic diagram of seat selection 1100.

S1706 displays a ticket purchase interface, the ticket purchase interface including a projection image corresponding to the at least one seat, and projection images corresponding to seats being images that are formed by projecting a screen of the show hall onto respective projection planes of the seats.

Figure 18:
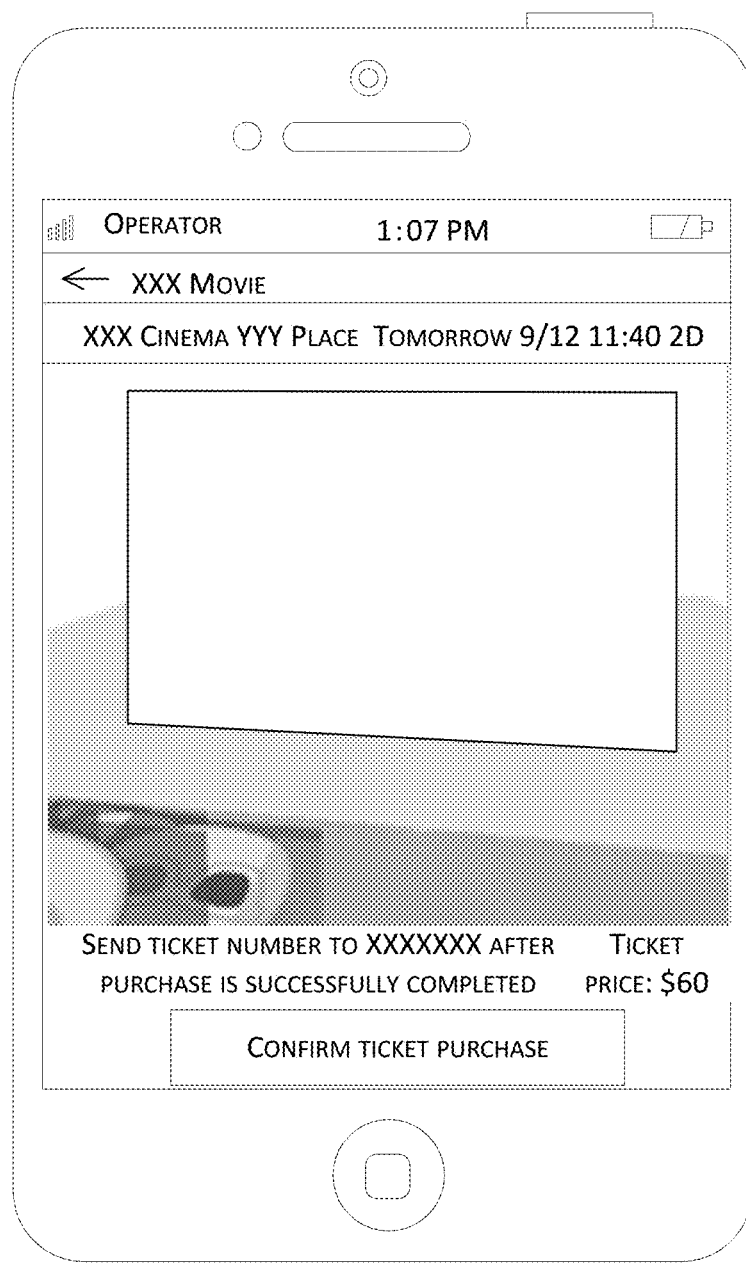
FIG. 18 shows a schematic diagram of a ticketing interface in accordance with the embodiments of the present disclosure.

In implementations, the ticket purchase interface may include a projection image of the at least one seat. Furthermore, the ticket purchase interface may also be a ticket purchase control. A user may purchase a ticket via the ticket purchase control. For example, a use may purchase a movie ticket, a drama ticket, or a sport game ticket, etc., by performing a single-click operation on the ticket purchase control. Apparently, the ticket purchase interface may also include a price display control for displaying a price of a ticket. For example, FIG. 18 is a schematic diagram of a ticket purchase interface 1800.

In implementations, after receiving the operation triggering instruction of the virtual venue image interface from a user, the method may further include individually determining a projection plane corresponding to each seat in the at least one seat; and individually projecting the screen of the show hall onto the projection plane of each seat to obtain a projection image of the respective seat. The projection plane corresponding to each seat may be located between the respective seat and the screen of the show hall.

The process of individually determining the projection plane corresponding to each seat in the at least one seat may include individually determining the projection plane corresponding to each seat in the at least one seat based on a specified distance, the specified distance being a distance between a seat and a projection plane corresponding to the seat. Alternatively, a reference point may be set. The reference point may be a center point of an observation object or an observation area. Alternatively, other points may be used. Correspondingly, the process of individually determining the projection plane corresponding to each seat in the at least one seat may include individually determining the projection plane corresponding to each seat in the at least one seat based on the reference point, the projection plane corresponding to the respective seat and a straight passing the seat and the reference point being intersected with each other.

In implementations, a projection image corresponding to a seat may be used as a reference seat. The method may further include receiving a display adjustment operation instruction from the user, the display adjustment operation instruction being used for generating a change vector of the reference seat, and the change vector including at least one of a moving distance or a moving direction; displaying a changed ticket purchase interface, the changed ticket purchase interface including a projection image corresponding to a changed reference seat. A process of generating a change vector may be referenced and compared with the process of establishing a moving vector. Furthermore, a process of changing a reference seat based on a change vector may also be referenced and compared with the process of moving a projection plane based on a moving vector.

Figure 19:
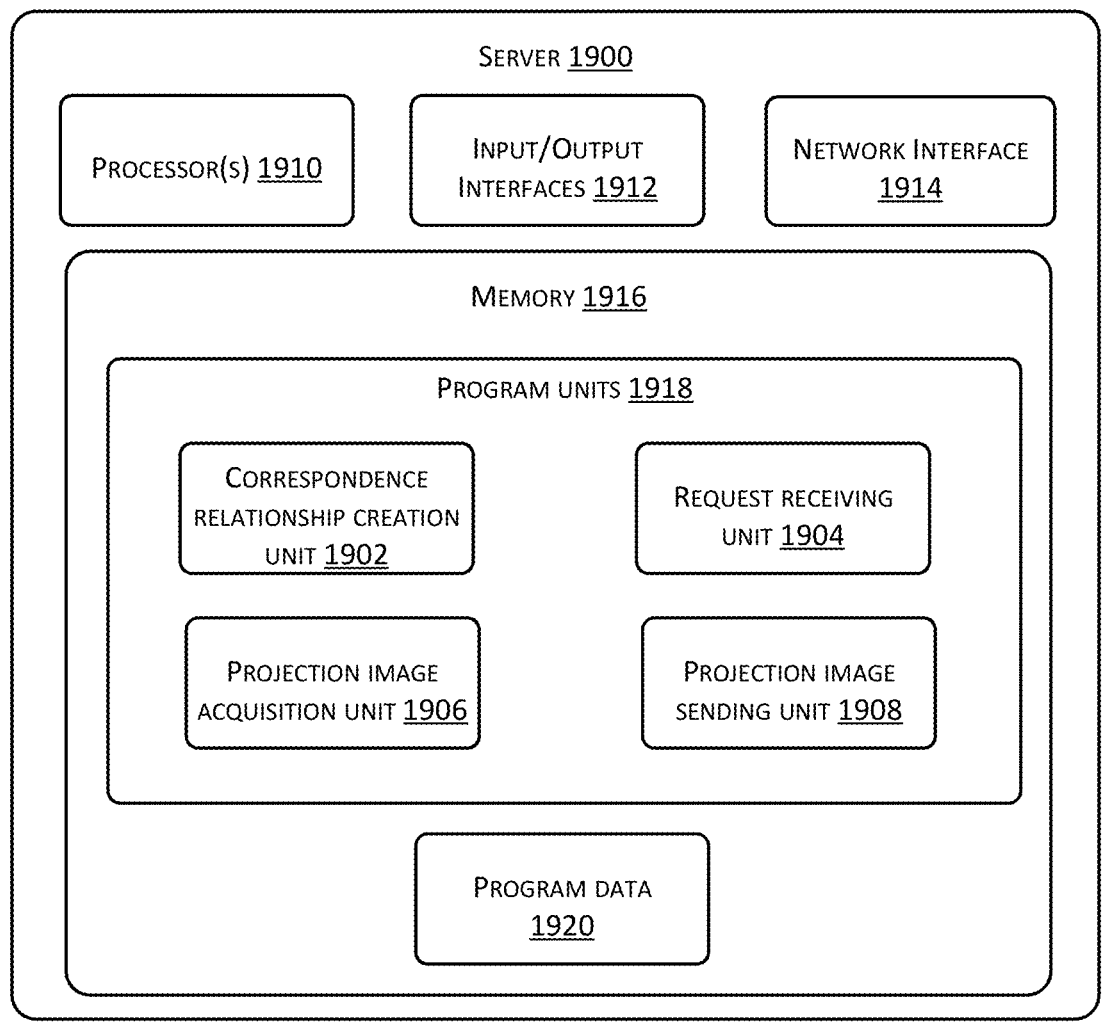
FIG. 19 shows a functional and structural diagram of a server in accordance with the embodiments of the present disclosure.

An exemplary server in accordance with the present disclosure is described herein. Referring to FIG. 19, the exemplary server 1900 may include the following units.

A correspondence relationship creation unit 1902 may establish correspondence relationships between projection images and observation point identifiers, the projection images being images formed by projecting an observation object and/or an observation area onto respective projection planes, and the observation point identifiers being used for uniquely identifying individual observation points.

A request receiving unit 1904 may receive a request for obtaining a projection image, the request including a particular observation point identifier.

A projection image acquisition unit 1906 may obtain a projection image corresponding to the particular observation point identifier based on the correspondence relationships between the projection images and the observation point identifiers.

A projection image sending unit 1908 may send the projection image to a client terminal.

In implementations, the server 1900 may further include one or more processors 1910, an input/output (I/O) interface 1912, a network interface 1914, and memory 1916.

The memory 1916 may include a form of computer readable media such as a volatile memory, a random access memory (RAM) and/or a non-volatile memory, for example, a read-only memory (ROM) or a flash RAM. The memory 1916 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 1916 may include program units 1918 and program data 1920. The program units 1918 may include one or more of foregoing the units, namely, the correspondence relationship creation unit 1902, the request receiving unit 1904, the projection image acquisition unit 1906, and the projection image sending unit 1908.

Figure 20:
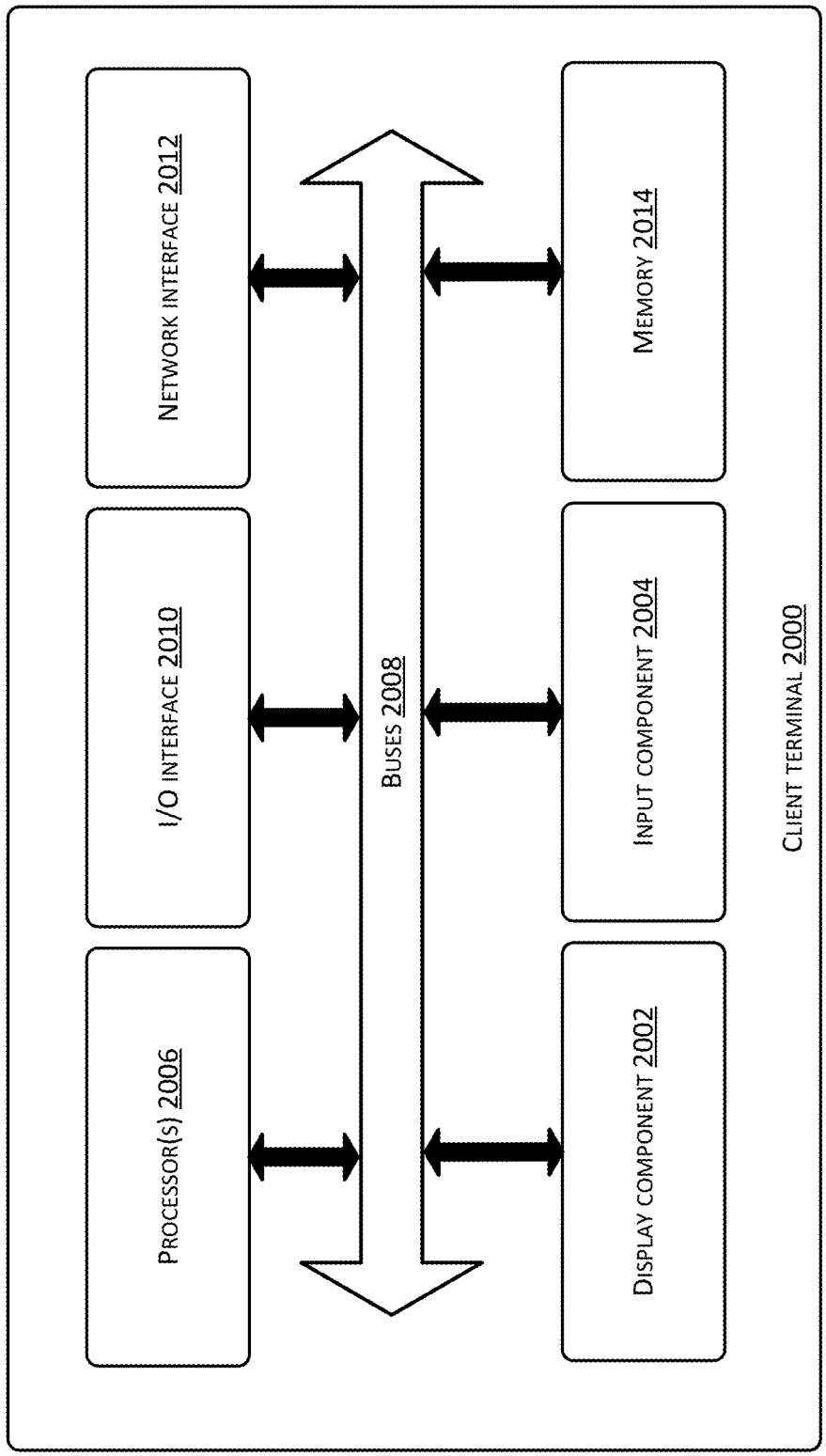
FIG. 20 shows a functional and structural diagram of a client terminal in accordance with the embodiments of the present disclosure.

Another exemplary client terminal in accordance with the present disclosure is described herein. Referring to FIG. 20, the exemplary client terminal 2000 may include a display component 2002, an input component 2004, processor(s) 2006, and buses 2008. In implementations, the buses are configured to couple the display component 2002, the input component 2004, and the processor(s) with one another. In implementations, the client terminal 2000 may further include an I/O interface 2010, a network interface 2012, and memory 2014. In implementations, the memory 2014 may be in a form of a computer-readable media as described in the foregoing description.

In implementations, the display component 2002 may include, but is not limited to, a LCD (Liquid Crystal Display) display, a CRT (Cathode Ray Tube) display, a LED (Light Emitting Diode) display, etc.

In implementations, the display component 2002 may be used for displaying an input interface. The input interface may be a virtual venue image interface. In this way, a user may specify an observation point in a more intuitive way. Apparently, the input interface may also provide an input field. The input field may be used for receiving location information entered by the user.

In implementations, the input component 2004 may be a touch sensitive component. For example, the client terminal 2000 may be a mobile smart terminal. The input component 2004 may be a touch screen of the mobile smart terminal. The input component 2004 may also be a physical button style component. For example, the client terminal 2000 may be a smart automated terminal, and the input component 2004 may be a keyboard of the smart automated terminal.

In implementations, the input component 2004 may be used for receiving input information of the user in the input interface. The input information may be an operation triggering instruction that occurs in a virtual venue image interface, or location information of an observation point that is entered by the user in an input field.

In implementations, the processor(s) 2006 can be implemented in any suitable form. For example, the processor 2006 can use, for example, a microprocessor or a processor, and computer-readable media that stores computer-readable program code (such as software or firmware) executable by the (micro) processor, a logic gate, a switch, an Application Specific Integrated Circuit (ASIC), a programmable logic controller, an embedded controller, etc.

In implementations, the processor(s) 2006 may be coupled to the display component 2002 and the input component 2004, and may be used for determining an observation point based on the input information, control the display component 2002 to display projection image(s) of an observation object and/or an observation area, the projection image(s) of the observation object and/or the observation area being image(s) formed by projecting the observation object and/or the observation area onto a projection plane corresponding to the observation point.

In implementations, the processor(s) 2006 may receive location information of an observation point entered by a user, and determine the observation point based on the location information of the observation point. Alternatively, the processor(s) 2006 may also control the display component 2002 to display a virtual venue image interface, and obtain an observation point after receiving an operation triggering instruction of a user on the virtual venue image interface.

In implementations, the processor(s) 2006 may determine a projection plane though an observation point and a specified distance, the specified distance being a distance between the observation point and the projection plane. Alternatively, the processor(s) 2006 may also set a reference point. Correspondingly, the processor(s) may further determine a projection plane based on the reference point and the observation point, the projection plane having an intersection with a straight line passing through the observation point and the reference point.

In implementations, the processor(s) 2006 may project the observation object and/or the observation area onto the projection plane using a predefined projection algorithm, to obtain the projection image(s) of the observation object and/or the observation area. The projection algorithm may include, but is not limited to, a perspective projection algorithm, a central projection algorithm, a Mercator projection algorithm, etc. For example, a gluPerspective function or a glFrustum function in OpenGL may be used to project the observation object and/or the observation area onto the projection plane, to obtain projection image(s) of the observation object and/or the observation area.

The specific functions implemented by the client terminal 2000, the display component 2002, the input component 2004, and the processor(s) 2006 in the above implementations may be referenced and compared with the foregoing embodiments of the present disclosure.

In 1900s, an improvement in a technology can be clearly distinguished as a hardware improvement (an improvement in a circuit structure such as a diode, a transistor, a switch, etc.) or a software improvement (for an improvement in a method procedure). However, along with the development of the technology, improvements in a number of existing method procedures can be seen as direct improvements in circuit structures of hardware. Design engineers program processes of improved methods into hardware circuits to obtain corresponding hardware circuit structure in most of the time. Therefore, it cannot be said that an improvement in a process of a method cannot be implemented using a hardware entity module. For example, a Programmable Logic Device, PLD (such as Field Programmable Gate Array, FPGA) is such an integrated circuit, logic functions thereof being determined by a user through device programming. A design engineer programs a digital system to be integrated in a PLD himself/herself, without the need of a chip manufacturer to design and manufacture a specialized integrated circuit chip2. Moreover, this type of programming replaces manually making integrated circuit chip, and mostly employs "logic compiler" software for implementation. This is similar to software complier used when programs are developed and compiled. Original codes before compiling are also written using a specialized programming language, which is called as Hardware Description Language (HDL). There are a number of different types of HDL, rather than one type. Examples include ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. The most commonly used one is VHDL (Very-High-Speed Integrated Circuit Hardware Description Language) and Verilog2. One skilled in the art can understand that a hardware circuit of a logical process of a method can be easily be implemented only through logic programming to program the process of the method using the above hardware description languages into an integrated circuit.

The embodiments of the present disclosure are described in a progressive manner. The same or similar portions of the embodiments can be referenced with each other. Each embodiment places an emphasis differently from other embodiments.

The systems, apparatuses, modules or units described in the foregoing embodiments may be implemented using computer chips or entities, or products having certain functions.

For the sake of description, the above apparatuses are described using functions as separate units. Apparently, the functions of the units may be implemented in one or more software components and/or hardware components when the present disclosure is implemented.

As can be seen from the description of the foregoing implementations, one skill in the art can clearly understand that the present disclosure can be implemented in a form of a software component with a necessary hardware platform. Based on this understanding, the essence of the technical solutions of the present disclosure or the portions that provide contributions to the existing technologies can be implemented in a form of a software product. This computer software product may be stored in storage media, such as ROM/RAM, a magnetic disk, an optical disk, etc., and includes instructions used for driving a computing device (which can be a personal computer, a server, or a networked device, etc.) to perform the method described in certain portions of the implementations of the present disclosure.

The present disclosure is applicable in multiple general or designated computer system environments or configurations, for example, a personal computer, a server computer, a handheld device or portable device, a tablet device, multi-processor system, microprocessor-based system, a set-top box, a programmable consumer electronic device, a network PC, a small-scale computer, a large-scale computer, and a distributed computing environment including any of the above systems or devices.

The present disclosure can be described in the context of computer-executable instructions executed by a computer, such as a program module. Generally, a program module includes a routine, a program, an object, a component, a data structure, etc., that performs a designated task or implements a designated abstract object type. The present disclosure can also be implemented in distributed computing environments. In these distributed computing environments, a remote processing device that is connected via a network can perform tasks. In a distributed computing environment, a program module can be located in local and remote computer-storage media including a storage device.

Although the present disclosure is described using the embodiments, one of ordinary skill in the art understands that the present disclosure has a number of variations and changes without departing the spirit of the present disclosure. The appended claims are intended to include these variations and changes without departing the spirit of the present disclosure.

The present disclosure may be further understood with clauses as follows.

Clause 1: An image display method comprising: providing a virtual venue image interface, the virtual venue image interface including a plurality of seats; receiving an operation triggering instruction of the virtual venue image interface, the operation triggering instruction for used for specifying at least one seat of the plurality of seats; and displaying a projection image corresponding to the at least one seat, the projection image corresponding to the at least one seat being an image that is formed by projecting an observation object and/or an observation area onto a projection plane corresponding to the at least one seat.

Clause 2: The method of Clause 1, wherein the virtual venue image interface further comprises the observation object and/or the observation area.

Clause 3: The method of Clause 1, wherein receiving the operation triggering instruction of the virtual venue image interface comprises detecting a clicking operation event in a region of the virtual venue image interface.

Clause 4: The method of Clause 1, wherein after receiving the operation triggering instruction of the virtual venue image interface, the method further comprises individually determining a respective projection plane corresponding to each seat of the at least one seat; and individually projecting the observation object and/or the observation area onto the respective plane corresponding to each seat to obtain a projection image corresponding to the seat.

Clause 5: The method of Clause 4, wherein the respective projection plane corresponding to each seat is located between the seat and the observation object, or is located between the seat and the observation area.

Clause 6: The method of Clause 4, wherein individually determining the respective projection plane corresponding to each seat of the at least one seat comprises individually determining the respective projection plane corresponding to each seat of the at least one seat based on a specified distance, the specified distance being a distance between the seat and the respective projection plane of the seat.

Clause 7: The method of Clause 4, further comprising setting a reference point, wherein individually determining the respective projection plane corresponding to each seat of the at least one seat comprises individually determining the respective projection plane corresponding to each seat of the at least one seat comprises based on the reference point, wherein the respective projection plane corresponding to the seat has an intersection with a straight line passing through the seat and the reference point.

Clause 8: The method of Clause 1, wherein the seat corresponding to the projection image is a reference seat, and wherein the method further comprises: receiving a display adjustment operation instruction from a user, the display adjustment operation instruction being used for generating a change vector of the reference seat, and the change vector including at least one of a moving distance or a moving direction; and displaying a projection image corresponding to a changed reference seat.

Clause 9: The method of Clause 8, wherein receiving the adjustment operation instruction from the user comprises detecting a clicking operation event or a swiping operation event in a region of the projection image.

Clause 10: The method of Clause 8, wherein the method is applicable in a mobile smart terminal, and wherein receiving the adjustment operation instruction from the user comprises detecting an occurrence of tilting or a change in moving acceleration of the mobile smart terminal.

Clause 11: The method of Clause 8, wherein the projection image is located on a projection image interface, the projection image interface having a trigger control, and wherein receiving the adjustment operation instruction from the user comprises detecting an occurrence of a clicking operation event or a swiping operation event for the trigger control.

Clause 12: The method of Clause 1, wherein the observation object comprises a screen, a stage, or a competition venue.

Clause 13: An image display method comprising: providing an input interface; receiving input information from a user via the input interface, the input information being used for determining an observation point; and displaying projection image(s) of an observation object and/or an observation area, the projection image(s) being image(s) formed by projecting the observation object and/or the observation area onto a projection plane corresponding to the observation point.

Clause 14: The method of Clause 13, wherein the input information comprises location information of the observation point.

Clause 15: The method of Clause 13, wherein the input interface comprises a virtual venue image interface, and the input information comprises a triggering instruction of the virtual venue image interface.

Clause 16: The method of Clause 15, wherein receiving the input information from the user via the input interface comprises detecting an occurrence of a clicking operation event in a region of the virtual venue image interface.

Clause 17: The method of Clause 15, wherein the virtual venue image interface comprises a virtual venue image, and the method further comprises: obtaining a triggering point corresponding to the triggering instruction of the virtual venue image interface; and obtaining a corresponding point in a venue model that corresponds to the triggering point, the corresponding point being set to be the observation point, and the venue model being used for generating the virtual venue image.

Clause 18: The method of Clause 15, wherein the virtual venue image interface comprises a virtual venue image, and the virtual venue image is generated based on a reference observation point, and wherein the method further comprises: obtaining a triggering point corresponding to the triggering instruction in the virtual venue image interface; obtaining a corresponding point in a venue model that corresponds to the triggering point; construct a straight line based on the corresponding point and the reference observation point; and selecting an object having the shortest distance from the straight line from the venue model, and taking the selected object as the observation point, wherein the venue model is used for generating the virtual venue image.

Clause 19: The method of Clause 13, further comprising determining the projection plane based on the observation point and a specified distance, the specified distance being a distance between the observation point and the projection plane.

Clause 20: The method of Clause 13, further comprising: setting a reference point; and determining the projection plane based on the reference point and the observation point, the projection plane having an intersection with a straight line passing the observation point and the reference point.

Clause 21: The method of Clause 13, further comprising: receiving a display adjustment operation instruction from a user, the display adjustment operation instruction being used for generating a moving vector of the projection plane, wherein the moving vector includes at least one of a moving distance, a moving angle, or a moving direction; and displaying a new projection image corresponding to a new projection plane after a move, the new projection image corresponding to the new projection plane being an image that is formed by projecting the observation object and/or the observation area onto the new projection plane.

Clause 22: The method of Clause 21, wherein receiving the display adjustment operation instruction from the user comprises detecting a clicking operation event or a swiping operation event in a region of the projection image.

Clause 23: The method of Clause 22, wherein the method is applicable in a mobile smart terminal, and wherein receiving the display adjustment operation instruction from the user comprises detecting an occurrence of tilting or a change in a moving acceleration of the mobile smart terminal.

Clause 24: The method of Clause 21, wherein the projection image is located on a projection image interface, and the projection image interface includes a trigger control, and wherein receiving the display adjustment operation instruction from the user comprises detecting a clicking operation event or a swiping operation event on the trigger control.

Clause 25: The method of Clause 13, wherein the observation point comprises a seat, and the observation area comprises a screen, a stage, or a competition venue.

Clause 26: The method of Clause 13, wherein the observation point is a point of the observation object in a venue model, and the observation object is a natural scene in the venue model.

Clause 27: A client terminal comprising: a display component used for displaying an input interface; an input component used for receiving input information from a user via the input interface; and processor(s) coupled to the display component and the input component, used for determining an observation point based on the input information, controlling the display component to display projection image(s) of an observation object and/or an observation area, the projection image(s) being image(s) formed by projecting the observation object and/or the observation area onto a projection plane corresponding to the observation point.

Clause 28: The client terminal of Clause 27, wherein the observation point comprises a seat, and the observation object comprises a screen, a stage, or a competition venue.

Clause 29: The client terminal of Clause 27, wherein the observation point is a point of the observation object in a venue model, and the observation object is a natural scene in the venue model.

Clause 30: An image sending method comprising: establishing correspondence relationships between projection images and observation point identifiers, the projection images being images formed by projecting observation object(s) and/or observation area(s) onto projection plane(s), and the observation point identifiers being used for uniquely identifying individual observation points; receiving a request for obtaining a projection image, the request including a particular observation point identifier; obtaining a particular projection image corresponding to the particular observation point identifier based on the correspondence relationships between the projection images and the observation point identifiers; and sending the particular projection image to a client terminal.

Clause 31: The method of Clause 30, wherein the individual observation points comprise seats, the observation point identifiers are used for uniquely identifying the seats, and the particular observation point identifier is used for uniquely identifying a seat selected by a user.

Clause 32: The method of Clause 30, wherein the projection image is obtained by determining a respective observation point, determining a respective projection plane based on the respective observation point; and projecting an observation object and/or an observation area onto the respective projection plane to obtain a projection image of the observation object and/or the observation area.

Clause 33: The method of Clause 32, wherein the respective projection plane is located between the respective observation point and the observation object, or is located between the respective observation point and the observation area.

Clause 34: The method of Clause 32, wherein determining the respective projection plane comprises determining the respective projection plane based on the respective observation point and a specified distance, the specified distance being a distance between the respective observation point and the respective projection plane.

Clause 35: The method of Clause 32, further comprising: setting a reference point, and determining the respective projection plane comprises determining the respective projection plane based on the reference point and the respective observation point, the respective projection plane having an intersection with a straight line that passes through the respective observation point and the reference point.

Clause 36: A server comprising: a correspondence relationship creation unit used for establishing correspondence relationships between projection images and observation point identifiers, the projection images being images formed by projecting observation object(s) and/or observation area(s) onto projection plane(s), and the observation point identifiers being used for uniquely identifying individual observation points; a request receiving unit used for receiving a request for obtaining a projection image, the request including a particular observation point identifier; a projection image acquisition unit used for obtaining a particular projection image corresponding to the particular observation point identifier based on the correspondence relationships between the projection images and the observation point identifiers; and a projection image sending unit used for sending the particular projection image to a client terminal.

Clause 37: An image display system, comprising a client terminal used for displaying a projection image, the projection image being an image formed by projecting at least one of an observation object or an observation area onto a projection plane.

Clause 38: The system of Clause 37, further comprising a server used for storing a projection image set, wherein the projection image set includes at least one projection image, the at least one projection image being the image formed by projecting the at least one of the observation object or the observation area onto the projection plane.

Clause 39: The system of Clause 38, wherein the server is further configured to establish correspondence relationships between projection images in the projection image set and observation point identifiers, the observation point identifiers being used for uniquely identifying individual observation points, the client terminal is further used for sending a request for obtaining a projection image to the server, the request including a particular observation point identifier, and receiving and displaying a projection image that is sent by the server, and the server is further used for receiving the request form the client terminal, obtain the projection image corresponding to the particular observation point identifier based on the correspondence relationships between the projection images in the projection image set and the observation point identifiers, and sending the projection image to the client terminal.

Clause 40: The system of Clause 37, further comprising a server used for storing a projection plane set, the projection plane set including at least one projection plane.

Clause 41: The system of Clause 40, wherein: the server is further used for establishing correspondence relationships between projection planes in the projection plane set and observation point identifiers, the observation point identifiers being used for uniquely identifying individual observation points; the client terminal is further used for sending a request for obtaining a projection image to the server, the request including a particular observation point identifier, receiving a projection plane, projecting the observation object and/or the observation area onto the projection plane to obtain the projection image of the observation object and/or the observation area, and displaying the projection image of the observation object and/or the observation area; and the server is further used for receiving the request from the client terminal, obtaining the projection plane corresponding to the particular observation point identifier from the projection plane set based on the correspondence relationships between the projection planes in the projection plane set and the observation point identifiers, and send the projection plane to the client terminal.

Clause 42: An image display method comprising: providing a virtual venue image interface of a show hall, the virtual venue image interface including a plurality of seats; receiving an operation triggering instruction of the virtual venue image interface, the operation triggering instruction being used for specifying at least one seat of the plurality of seats; and displaying a ticket purchase interface, the ticket purchase interface including a projection image corresponding to the at least one seat of the plurality of seats, wherein the projection image corresponding to the at least one seat is an image that is formed by projecting a screen of the show hall into a projection plane corresponding to the at least one seat.

Clause 43: The method of Clause 42, wherein receiving the operation triggering instruction of the virtual venue image interface comprises detecting an occurrence of a clicking operation event in a region of the virtual venue image interface.

Clause 44: The method of Clause 42, wherein after receiving the operation triggering instruction of the virtual venue image interface, the method further comprises: separately determining a respective projection plane corresponding to each seat of the plurality of seats; and separately projecting the screen of the show hall onto the respective projection plane corresponding to each seat to obtain a projection image of the respective seat.

Clause 45: The method of Clause 42, wherein the projection image corresponding to the at least one seat is a reference seat, and the method further comprises: receiving a display adjustment operation instruction from a user, the display adjustment operation instruction being used for generating a change vector of the reference vector, wherein the change vector includes at least one of a moving distance or a moving direction; and displaying a new ticket purchase interface after a change, the new ticket purchase including a projection image corresponding to a new reference seat after the change.

Clause 46: The method of Clause 45, wherein receiving the display adjustment operation instruction from the user comprises detecting an occurrence of a clicking operation event or a swiping operation event in a region of the ticket purchase interface.

Clause 47: The method of Clause 45, wherein the method is applicable in a mobile smart terminal, and wherein receiving the display adjustment operation instruction from the user comprises detecting an occurrence of tilting or a change in a moving acceleration of the mobile smart terminal.

Clause 48: The method of Clause 45, wherein the ticket purchase interface includes a trigger control, and wherein receiving the display adjustment operation instruction from the user comprises detecting an occurrence of a clicking operation event or a swiping operation event on the trigger control.

What is claimed is:

1. A method implemented by a computing device, the method comprising:
   providing an input interface on a display panel of the computing device;
   receiving input information from a user via the input interface, the input information being used for determining an observation point with respect to an observation object and/or an observation area observed by the user on the display panel of the computing device;
   implementing simulation of a state of the observation object and/or the observation area at the observation point on the display panel of the computing device by displaying a projection image of at least one of the observation object or the observation area, the projection image being an image formed by projecting the at least one of the observation object or the observation area onto a projection plane corresponding to the observation point in a venue model; and
   rotating the projection plane in the venue model with the observation point as a center in response to an adjustment operation of the user on the input interface of the display panel of the computing device;
   wherein the projection image is obtained by determining the observation point, determining the projection plane based on the observation point; and projecting the observation object and/or the observation area onto the projection plane to obtain the projection image of the observation object and/or the observation area; and
   wherein the projection plane is located between the observation point and the observation object and/or the observation area.

2. The method of claim 1, wherein the input information comprises location information of the observation point.

3. The method of claim 2, wherein the input interface comprises a virtual venue image interface, and the input information comprises a triggering instruction of the virtual venue image interface.

4. The method of claim 3, wherein receiving the input information from the user via the input interface comprises detecting an occurrence of a clicking operation event in a region of the virtual venue image interface.

5. The method of claim 3, wherein the virtual venue image interface comprises a virtual venue image, and the method further comprises:
   obtaining a triggering point corresponding to the triggering instruction of the virtual venue image interface; and
   obtaining a corresponding point in the venue model that corresponds to the triggering point, the corresponding point being set to be the observation point, and the venue model being used for generating the virtual venue image.

6. The method of claim 3, wherein the virtual venue image interface comprises a virtual venue image, and the virtual venue image is generated based on a reference observation point, and wherein the method further comprises:
   obtaining a triggering point corresponding to the triggering instruction in the virtual venue image interface;
   obtaining a corresponding point in the venue model that corresponds to the triggering point; construct a straight line based on the corresponding point and the reference observation point; and
   selecting an object having the shortest distance from the straight line from the venue model, and taking the selected object as the observation point, wherein the venue model is used for generating the virtual venue image.

7. The method of claim 1, wherein determining the projection plane comprises determining the projection plane based on the observation point and a specified distance, the specified distance being a distance between the observation point and the projection plane.

8. The method of claim 1, further comprising:
setting a reference point; and
determining the projection plane based on the reference point and the observation point, and the projection plane having has an intersection with a straight line passing the observation point and the reference point.

9. The method of claim 1, further comprising:
receiving a display adjustment operation instruction from a user, the display adjustment operation instruction being used for generating a moving vector of the projection plane, wherein the moving vector includes at least one of a moving distance, a moving angle, or a moving direction; and
displaying a new projection image corresponding to a new projection plane after a move, the new projection image corresponding to the new projection plane being an image that is formed by projecting the observation object and/or the observation area onto the new projection plane.

10. The method of claim 9, wherein receiving the display adjustment operation instruction from the user comprises detecting a clicking operation event or a swiping operation event in a region of the projection image.

11. A server comprising:
one or more processors;
memory;
a correspondence relationship creation unit stored in the memory and executable by the one or more processors to establish correspondence relationships between projection images and observation point identifiers, the projection images being images formed by projecting at least one of one or more observation objects or one or more observation areas onto one or more projection planes in a venue model, and the observation point identifiers being used for uniquely identifying individual observation points;
a request receiving unit in the memory and executable by the one or more processors to receive a request for obtaining a projection image, the request including a particular observation point identifier;
a projection image acquisition unit in the memory and executable by the one or more processors to implement simulation of a state of a respective observation object and/or a respective observation area observed by a user at a respective observation point on a display panel of a client terminal by obtaining a particular projection image corresponding to the particular observation point identifier based on the correspondence relationships between the projection images and the observation point identifiers, the projection image acquisition unit being further configured to rotate a respective projection plane in the venue model with the respective observation point as a center in response to an adjustment operation of the user on an input interface of the display panel of the client terminal; and
a projection image sending unit in the memory and executable by the one or more processors to send the particular projection image to the client terminal;
wherein a respective projection image of the projection images is obtained by determining the respective observation point, determining the respective projection plane based on the respective observation point; and projecting at least one of the respective observation object or the respective observation area onto the respective projection plane to obtain the respective projection image of the at least one of the observation object or the observation area; and
wherein the respective projection plane is located between the respective observation point and the observation object, or is located between the respective observation point and the observation area.

12. The server of claim 11, wherein determining the respective projection plane comprises determining the respective projection plane based on the respective observation point and a specified distance, the specified distance being a distance between the respective observation point and the respective projection plane.

13. The server of claim 11, wherein a reference point is set, and determining the respective projection plane comprises determining the respective projection plane based on the reference point and the respective observation point, and the respective projection plane having has an intersection with a straight line that passes through the respective observation point and the reference point.

14. One or more computer-readable media storing executable instructions that, when executable by one or more processors, cause the one or more processors to perform acts comprising:
providing a virtual venue image interface on a display panel of a client terminal, the virtual venue image interface including a plurality of observation points;
receiving an operation triggering instruction of the virtual venue image interface, the operation triggering instruction being used for specifying at least one observation point of the plurality of observation points with respect to an observation object and/or an observation area observed by a user on the display panel of the client terminal;
implementing simulation of a state of the observation object and/or the observation area at the at least one observation point on the display panel of the client terminal by displaying a projection image corresponding to the at least one observation point, the projection image corresponding to the at least one observation point being an image that is formed by projecting at least one of the observation object or the observation area onto a projection plane corresponding to the at least one observation point in a venue model; and
rotating the projection plane in the venue model with the at least one observation point as a center in response to an adjustment operation of the user on the virtual venue image interface on the display panel of the client terminal;
wherein the projection image is obtained by determining the observation point, determining the projection plane based on the observation point; and projecting the observation object and/or the observation area onto the projection plane to obtain the projection image of the observation object and/or the observation area; and
wherein the projection plane is located between the observation point and the observation object and/or the observation area.

15. The one or more computer-readable media of claim 14, wherein the virtual venue image interface further comprises the observation object and/or the observation area.

16. The one or more computer-readable media of claim 14, wherein receiving the operation triggering instruction of the virtual venue image interface comprises detecting a clicking operation event in a region of the virtual venue image interface.

17. The one or more computer-readable media of claim 14, the acts further comprising:
    individually determining a respective projection plane corresponding to each observation point of the at least one observation point after receiving the operation triggering instruction of the virtual venue image interface; and
    individually projecting the at least one of the observation object or the observation area onto the respective plane corresponding to each observation point to obtain a projection image corresponding to the respective observation point.

18. The one or more computer-readable media of claim 14, the acts further comprising:
    receiving a display adjustment operation instruction from a user, the display adjustment operation instruction being used for generating a change vector of the at least one observation point, and the change vector including at least one of a moving distance or a moving direction; and
    displaying a new projection image corresponding to a new observation point after a change.

19. A method comprising:
    providing a virtual venue image interface on a display panel a client terminal, the virtual venue image interface including a plurality of seats;
    receiving an operation triggering instruction of the virtual venue image interface, the operation triggering instruction for used for specifying at least one seat of the plurality of seats with respect to an observation object and/or an observation area observed by the user on the display panel of the client terminal;
    implementing simulation of a state of the observation object and/or the observation area at the at least one seat on the display panel of the client terminal by displaying a projection image corresponding to the at least one seat, the projection image corresponding to the at least one seat being an image that is formed by projecting the observation object and/or the observation area onto a projection plane corresponding to the at least one seat in a venue model; and
    rotating the projection plane in the venue model with the at least one seat as a center in response to an adjustment operation of a user on the input interface of the display panel of the client terminal;
    wherein the projection image is obtained by determining the projection plane based on the at least one seat, and projecting the observation object and/or the observation area onto the projection plane to obtain the projection image of the observation object and/or the observation area; and
    wherein the projection plane is located between the at least one seat and the observation object and/or the observation area.

* * * * *